(12) United States Patent
Hoefken et al.

(10) Patent No.: US 11,015,685 B2
(45) Date of Patent: May 25, 2021

(54) AXIAL CAM GEARBOX MECHANISM

(71) Applicant: Motus Labs, LLC, Dallas, TX (US)

(72) Inventors: Carlos A. Hoefken, Dallas, TX (US);
Barry F. Koch, Ingolstadt (DE)

(73) Assignee: MOTUS LABS, LLC, Dallas, TX (US)

( * ) Notice: Subject to any disclaimer, the term of this patent is extended or adjusted under 35 U.S.C. 154(b) by 0 days.

(21) Appl. No.: 16/874,379

(22) Filed: May 14, 2020

(65) Prior Publication Data

US 2020/0271203 A1    Aug. 27, 2020

Related U.S. Application Data

(63) Continuation-in-part of application No. 16/818,738, filed on Mar. 13, 2020, which is a continuation of application No. 16/537,218, filed on Aug. 9, 2019, now Pat. No. 10,626,964, which is a continuation-in-part of application No. 16/194,053, filed on Nov. 16, 2018, now Pat. No. 10,428,916, which is a continuation-in-part of application No. 14/995,094, filed on Jan. 13, 2016, now Pat. No. 10,260,606, which is a continuation of application No. 13/795,488, filed on Mar. 12, 2013, now Pat. No. (Continued)

(51) Int. Cl.
*F16H 25/06* (2006.01)

(52) U.S. Cl.
CPC ........ *F16H 25/06* (2013.01); *Y10T 74/18296* (2015.01)

(58) Field of Classification Search
CPC .......... F16H 25/00; F16H 25/02; F16H 25/04; F16H 25/06
See application file for complete search history.

(56) References Cited

U.S. PATENT DOCUMENTS

| 1,666,458 A | 4/1928 | Leland |
| 2,071,235 A | 2/1937 | Newman |

(Continued)

FOREIGN PATENT DOCUMENTS

CN    102121511 B    7/2011

OTHER PUBLICATIONS

Schwartz et al, "Making the Right Shaft Connections," MachineDesign, Aug. 1, 2000, pp. 1-26, online document.

*Primary Examiner* — David M Fenstermacher
(74) *Attorney, Agent, or Firm* — Jeffrey G. Degenfeler; Carstens & Cahoon, LLP

(57) ABSTRACT

The gearbox mechanism includes a plurality of cam-actuated rocker block assemblies, for transferring power to an output gear. Each rocker block assembly includes a gear pad having a surface that periodically interfaces with the output gear. The interface surface comprises a plurality of projections which correspond to complementary projections on the output gear. Each rocker block assembly further includes a gear pad, a rocker arm, cam followers and/or path followers, which connect or link the rocker block to a cam assembly, which in turn is connected to a power source. The cam assembly includes about its circumference a unique pathway or groove for each cam followers and/or a second unique pathway or groove in the cam's planar surface for the pathway follower so that the movement of the gear block may be controlled in two or three dimensions in accordance with a certain design parameter.

30 Claims, 21 Drawing Sheets

Related U.S. Application Data 9,261,176, said application No. 16/818,738 is a continuation-in-part of application No. 16/266,629, filed on Feb. 4, 2019, now Pat. No. 10,830,318, which is a continuation-in-part of application No. 16/111,344, filed on Aug. 24, 2018, now Pat. No. 10,240,666, which is a continuation-in-part of application No. 14/995,094, filed on Jan. 13, 2016, now Pat. No. 10,260,606.

(56) References Cited

U.S. PATENT DOCUMENTS

| | | | |
|---|---|---|---|
| 2,134,603 A | 10/1938 | Pickering | |
| 2,167,590 A | 7/1939 | Slaugenhop | |
| 2,521,067 A | 9/1950 | Kenison | |
| 2,843,095 A | 7/1958 | Prentice | |
| 3,088,333 A | 5/1963 | Walton | |
| 3,386,298 A | 6/1968 | Luther | |
| 3,650,157 A | 3/1972 | Strathearn et al. | |
| 3,848,474 A | 11/1974 | Epstein | |
| 3,913,417 A | 10/1975 | Vangor | |
| 3,998,112 A * | 12/1976 | Pierrat | F16H 1/32 475/168 |
| 4,075,893 A | 2/1978 | Koch | |
| 4,179,945 A | 12/1979 | Obermann | |
| 4,713,985 A * | 12/1987 | Ando | F16H 1/32 475/168 |
| 4,743,763 A | 5/1988 | Cutburth et al. | |
| 4,788,882 A * | 12/1988 | Fulop | F16H 25/06 74/570.2 |
| 5,312,306 A * | 5/1994 | Folino | F16H 25/06 475/196 |
| 5,321,988 A * | 6/1994 | Folino | F16H 25/06 475/196 |
| 5,351,568 A * | 10/1994 | Feterl | F16H 25/06 74/116 |
| 5,562,564 A * | 10/1996 | Folino | F16H 25/06 476/36 |
| 5,600,999 A * | 2/1997 | Folino | F16H 3/72 475/196 |
| 5,722,910 A | 3/1998 | Folino | |
| 6,109,136 A | 8/2000 | Dold | |
| 6,202,509 B1 | 3/2001 | Dold | |
| 6,220,115 B1 | 4/2001 | Him et al. | |
| 6,231,468 B1 | 5/2001 | Bajulaz | |
| 6,340,127 B1 * | 1/2002 | Kopetzky | B60R 22/415 242/382.2 |
| 6,736,028 B2 * | 5/2004 | Ruttor | F16H 25/06 74/640 |
| 6,805,025 B2 * | 10/2004 | Ruttor | F16H 25/06 475/161 |
| 7,086,309 B2 | 8/2006 | Stoianovici et al. | |
| 7,211,016 B2 | 5/2007 | Yan et al. | |
| 7,367,912 B2 * | 5/2008 | Ivankovic | F16H 1/32 475/170 |
| 7,506,668 B2 * | 3/2009 | Vanderjeugt | D03C 1/00 139/58 |
| 8,516,981 B2 | 8/2013 | Jacques et al. | |
| 8,534,151 B2 | 9/2013 | Johnson et al. | |
| 8,998,763 B2 * | 4/2015 | Wengenroth | F16H 25/06 475/168 |
| 9,261,176 B2 * | 2/2016 | Hoefken | F16H 25/04 |
| 9,327,618 B2 | 5/2016 | Villarroel et al. | |
| 9,394,984 B2 | 7/2016 | Balsiger | |
| 10,151,375 B2 * | 12/2018 | Hoefken | F16H 29/02 |
| 10,240,666 B2 * | 3/2019 | Hoefken | F16H 25/06 |
| 10,288,149 B2 * | 5/2019 | Matsuoka | F16H 48/10 |
| 10,371,240 B2 * | 8/2019 | Rossberger | F16H 49/001 |
| 10,428,916 B2 * | 10/2019 | Hoefken | F16H 29/04 |
| 10,626,964 B2 * | 4/2020 | Hoefken | F16H 25/06 |
| 2001/0020399 A1 | 9/2001 | Angeles et al. | |
| 2003/0047025 A1 | 3/2003 | Ruttor | |
| 2005/0229731 A1 | 10/2005 | Parks et al. | |
| 2007/0180940 A1 | 8/2007 | Mizon et al. | |
| 2010/0206686 A1 | 8/2010 | Johnson et al. | |
| 2011/0298322 A1 | 12/2011 | Sherwin et al. | |
| 2012/0289372 A1 | 11/2012 | Wengenroth | |
| 2012/0291731 A1 | 11/2012 | Parsche | |
| 2013/0255421 A1 | 10/2013 | Schmidt et al. | |
| 2014/0015382 A1 | 1/2014 | Kim | |
| 2014/0232159 A1 | 8/2014 | Villarroel et al. | |
| 2014/0248017 A1 | 9/2014 | Nakada | |
| 2014/0260721 A1 | 9/2014 | Hoefken | |
| 2016/0116021 A1 | 4/2016 | Jacobson | |
| 2016/0131232 A1 | 5/2016 | Hoefken | |
| 2016/0153535 A1 | 6/2016 | Albou et al. | |
| 2018/0363745 A1 | 12/2018 | Hoefken | |

* cited by examiner

AXIAL CAM GEARBOX MECHANISM

CROSS-REFERENCE TO RELATED APPLICATION

This application is a continuation-in-part of U.S. patent application Ser. No. 16/818,738 filed Mar. 13, 2020, which is a continuation of U.S. patent application Ser. No. 16/537,218 filed Aug. 9, 2019 (now U.S. Pat. No. 10,526,964), which is a continuation-in-part application of U.S. patent application Ser. No. 16/194,053 filed Nov. 16, 2018 (now U.S. Pat. No. 10,428,916), which is a continuation-in-part application of U.S. patent application Ser. No. 14/995,094 filed Jan. 13, 2016 (now U.S. Pat. No. 10,260,606), which is a continuation application of U.S. patent application Ser. No. 13/795,488 filed Mar. 12, 2013 (now U.S. Pat. No. 9,261,176), the technical disclosures of which are hereby incorporated herein by reference.

This application is a continuation-in-part of U.S. patent application Ser. No. 16/818,738 filed Mar. 13, 2020, which is also related to and a continuation-in-part application of U.S. patent application Ser. No. 16/266,629 filed Feb. 4, 2019, which is a continuation-in-part application of U.S. patent application Ser. No. 16/111,344 filed Aug. 24, 2018 (now U.S. Pat. No. 10,240,666), which is a continuation-in-part application of U.S. patent application Ser. No. 14/995,094 filed Jan. 13, 2016 (now U.S. Pat. No. 10,260,606), which is a continuation application of U.S. patent application Ser. No. 13/795,488 filed Mar. 12, 2013 (now U.S. Pat. No. 9,261,176), the technical disclosures of which are hereby incorporated herein by reference.

BACKGROUND OF THE INVENTION

Technical Field of the Invention

The present invention relates to a universal gearbox mechanism featuring cam-actuated gear block assemblies that periodically engage the output gear causing power transfer. It has particular, but not exclusive, application for use in servomotor assemblies.

Description of the Related Art

Conventional machines typically consist of a power source and a power transmission system, which provides controlled application of the power. A variety of proposals have previously been made in the art of power transmission systems. The simplest transmissions, often called gearboxes to reflect their simplicity (although complex systems are also called gearboxes in the vernacular), provide gear reduction (or, more rarely, an increase in speed), sometimes in conjunction with a change in direction of the powered shaft. A transmission system may be defined as an assembly of parts including a speed-changing gear mechanism and an output shaft by which power is transmitted from the power source (e.g., electric motor) to an output shaft. Often transmission refers simply to the gearbox that uses gears and gear trains to provide speed and torque conversions from a power source to another device.

Gearboxes have been used for many years and they have many different applications. In general, conventional gearboxes comprise four main elements: power source; drive train; housing and output means. The power source places force and motion into the drive train. The power source may be a motor connected to the drive train through suitable gearing, such as a spur, bevel, helical or worm gear.

The drive train enables the manipulation of output motion and force with respect to the input motion and force provided by the power source. The drive train typically comprises a plurality of gears of varying parameters such as different sizes, number of teeth, tooth type and usage, for example spur gears, helical gears, worm gears and/or internal or externally toothed gears.

The gearbox housing is the means which retains the internal workings of the gearbox in the correct manner. For example, it allows the power source, drive train and output means to be held in the correct relationship for the desired operation of the gearbox. The output means is associated with the drive train and allows the force and motion from the drive train to be applied for an application. Usually, the output means exits the gearbox housing.

The output means typically can be connected to a body whereby the resultant output motion and force from the drive train is transmitted via the output means (e.g., an output shaft) to the body to impart the output mean's motion and force upon the body. Alternatively, the output means can impart the motion and force output from the drive train to the gearbox housing whereby the output means is held sufficiently as to allow the gearbox housing to rotate.

Rotating power sources typically operate at higher rotational speeds than the devices that will use that power. Consequently, gearboxes not only transmit power but also convert speed into torque. The torque ratio of a gear train, also known as its mechanical advantage, is determined by the gear ratio. The energy generated from any power source has to go through the internal components of the gearbox in the form of stresses or mechanical pressure on the gear elements. Therefore, a critical aspect in any gearbox design comprises engineering the proper contact between the intermeshing gear elements. These contacts are typically points or lines on the gear teeth where the force concentrates. Because the area of contact points or lines in conventional gear trains is typically very low and the amount of power transmitted is considerable, the resultant stress along the points or lines of contact is in all cases very high. For this reason, designers of gearbox devices typically concentrate a substantial portion of their engineering efforts in creating as large a line of contact as possible or create as many simultaneous points of contacts between the two intermeshed gears in order to reduce the resultant stress experienced by the respective teeth of each gear.

Another important consideration in gearbox design is minimizing the amount of backlash between intermeshing gears. Backlash is the striking back of connected wheels in a piece of mechanism when pressure is applied. In the context of gears, backlash (sometimes called lash or play) is clearance between mating components, or the amount of lost motion due to clearance or slackness when movement is reversed and contact is re-established. For example, in a pair of gears backlash is the amount of clearance between mated gear teeth.

Theoretically, backlash should be zero, but in actual practice some backlash is typically allowed to prevent jamming. It is unavoidable for nearly all reversing mechanical couplings, although its effects can be negated. Depending on the application it may or may not be desirable. Typical reasons for requiring backlash include allowing for lubrication, manufacturing errors, deflection under load and thermal expansion. Nonetheless, low backlash or even zero backlash is required in many applications to increase precision and to avoid shocks or vibrations. Consequently, zero backlash gear train devices are in many cases expensive, short lived and relatively heavy.

Weight and size are yet another consideration in the design of gearboxes. The concentration of the aforementioned stresses on points or lines of contact in the intermeshed gear trains necessitates the selection of materials that are able to resist those forces and stresses. However, those materials are oftentimes relatively heavy, hard and difficult to manufacture.

Thus, a need exists for an improved and more lightweight gearbox mechanism, which is capable of handling high stress loads in points or lines of contact between its intermeshed gears. Further, a need exists for an improved and more lightweight gearbox mechanism having low or zero backlash that is less expensive to manufacture and more reliable and durable.

SUMMARY OF THE INVENTION

The present invention overcomes many of the disadvantages of prior art gearbox mechanisms by utilizing a plurality of cam-actuated gear block assemblies to transfer power from a power shaft to a secondary or output gear element. In one embodiment, each gear block assembly includes a gear block having a surface that periodically interfaces with a secondary or output gear element. In a preferred embodiment the interface surface comprises a plurality of projections or teeth which correspond to complementary projections or gear teeth on the output gear element. Each gear block assembly further includes a plurality of linkage assemblies, which connect or link the gear block to a cam assembly, which in turn is connected to a power source. The cam assembly includes about its circumference a unique pathway or groove for each linkage assembly of a particular gear block assembly so that the movement of the gear block may be controlled in two dimensions in accordance with a certain design parameter.

The gear block assembly is designed to drive its respective gear block through a two-dimensional circuit in response to rotation of the cam assembly. Broadly speaking, the two-dimensional circuit includes urging the gear block to engage a secondary or output gear element and move or rotate a specified quantum distance prior to disengaging from the output gear element, and returning back the specified quantum distance to again reengage the secondary or output gear element once again and repeat the process. The travel path or circuit of each gear block is controlled by adjusting the length and configuration of the various linkage assemblies and altering the pathways or grooves formed in the cam assembly.

When adapted to a gearbox mechanism a plurality of gear block assemblies are configured about a central axis of the cam assembly. The cam assembly is rotatively coupled with a power source. As the cam assembly rotates, the cam follower elements of the respective linkage assemblies of each gear block assembly maintain contact with a particular pathway or groove formed in the circumferential surface of the cam assembly. The variance of distance from the center of rotation of the different pathways or grooves of the cam assembly causes the respective linkage assemblies to work in concert to move their respective gear block through a predetermined circuit of movement. This predetermined circuit of movement of the gear block can be precisely calibrated to meet specific engineering requirements. For example, the torque ratio and speed reduction may be regulated and controlled by adjusting the circuit of movement of each gear block assembly.

Another embodiment of a gearbox mechanism of the present invention may include a main body, an output element, and a plurality of simplified gear block assemblies. Additionally, the gearbox mechanism may have a retainer that interfaces with the main body and the output element. Each simplified gear block assembly includes a gear block, a torque lever, cam follower(s), and/or socket (or a portion of a socket). The cam actuated gear block assemblies are configured about a central axis. The rotational force on the cam element allows for a driving or rotative force on the cam actuated gear block assemblies.

In a preferred embodiment, the torque lever also has a set of cam followers allowing for the following of a specified path formed along a planar surface of the cam element. The cam element includes at least one unique pathway or groove that interfaces with the cam follower of gear block or torque lever so that as the cam element rotates, the movement of the gear block or torque lever is controlled in two dimensions in accordance with at least one certain design parameter.

By varying the radius of the pathway or grooves on the cam element, the cam actuated gear block assemblies drive respective gear block(s) through a two-dimensional circuit in response to rotation of the cam element. Broadly speaking, the two-dimensional circuit includes urging the gear block to engage the output element and move and/or rotate the output element a specified distance prior to disengaging from the output element, and returning back the specified distance to again reengage the output element once again, and repeat the process. The travel path or circuit of each gear block is controlled by adjusting the length, width, height, and/or size of the respective gear block and/or torque lever and/or altering the pathways or grooves formed in the cam element. In a preferred embodiment, there is at least one pivot point for both the gear block and the torque lever that allows each to pivot separately from each other.

Another embodiment of the gearbox mechanism of the present invention may include a cam element, a main body and output element and a plurality of simplified gear block assemblies. In at least one example, the output element is retained within the main body by a retainer. The gear block assemblies are placed within the main body and interface with the output element and cam element. The gear block assemblies can include a rocker arm, a gear block, a cam follower, and a pathway tracker. The cam follower and/or pathway tracker follow pathways in the cam element and/or an axial cam to generate forces on the rocker arm and/or the gear block(s) generating a pivoting motion for the both the rocker arm and the gear block(s). In at least one version, the pivoting motion can be a generally square pivot path for the gear block(s). While in other versions, the pivot path of the gear block(s) will generally be oval or circular.

In at least one variant embodiment, a central aperture aligned with a central axis may be a part of the gearbox mechanism. Each gear block assembly includes a gear block, a rocker arm, and at least one cam follower, which connect the gear block to the planar surface of the cam element. The rocker arm, and/or gear block can interact to be pivotally attached, and correspond to the interaction and/or engagement of the cam follower(s) with the cam element. The rotation of the output element may also be controlled through a reverse or tension engagement (i.e., negative bias) of gear block(s) that are not in a driving or positive bias rotational engagement in order to reduce and/or element backlash.

In at least one version, the main body provides a housing for the gear assemblies. The gear block assemblies rest and/or are supported by the main body retaining surface. The gear block(s) may also be retained and/or supported by the main body gear block interface surface. The rocker arm(s)

may also be supported and/or retained by the main body interface surface, and/or the main body rocker arm void as defined by the main body. The pivoting motion of the rocker arm can also coincide with a pivoting motion of the gear block that allows for the interfacing, engaging, and/or rotating of an output element.

In at least one variant embodiment, the gearbox mechanism can include a rocker block assembly having a rocker arm, a cam follower, and a pathway follower coupled to a rocker block. The cam follower and the pathway follower can track pathways formed in a cam and wherein the pathways are formed in planes that are perpendicular to one another. The rocker block assembly can also include a compliance mechanism that applies to a compliance force to a gear pad that is coupled to the rocker block.

Numerous embodiments of gearbox mechanisms are possible using the gear block assembly of the present invention. The plurality of gear block assemblies configured about the central axis of the cam assembly can comprise either an odd or even number of gear block assemblies. At least two, and preferably three gear block assemblies are required for a gearbox mechanism of the present invention. The movement of the gear block assemblies typically move in a rotational series to one another. At least one gear block assembly is always engaged with the output gear element at any particular instance in time. Preferably, only one gear block assembly is disengaged with the output gear element at any particular instance in time. However, in another preferred embodiment wherein the plurality of gear block assemblies comprises four or more even-numbered gear block assemblies, the gear block assemblies configured on opposing sides of the cam assembly engage and disengage in unison from the secondary or output gear element.

The design of the gear block assemblies of the present invention enable a greater number of gear teeth to engage the output gear at any given time, thereby spreading the stresses associated therein across a greater area. By dramatically increasing the contact area between the gear block and the output gear at any given time the mechanical stress level is significantly decreased. In addition, the gear block assemblies of the present invention reduce backlash to zero and even preloaded conditions to create a tight connection between the power source and the powered device. This is an extremely desirable feature especially for high vibration applications. By reducing backlash to zero or preloaded condition, the mechanical impedance may also be reduced at a broad range of high vibration frequencies. Moreover, because the stresses associated with engagement of the gear block against the output gear are distributed across a greater area, the gear block mechanism may be manufactured of lighter weight, more flexible materials, which are less expensive and easier to manufacture, with no degradation in reliability. Indeed, using flexible materials further reduces the mechanical impedance at low frequencies. By reducing its weight and size, the gearbox mechanism of the present invention is adaptable to a broad range of applications that were previously impractical because of weight and space limitations.

BRIEF DESCRIPTION OF THE DRAWINGS

A more complete understanding of the method and apparatus of the present invention may be had by reference to the following detailed description when taken in conjunction with the accompanying drawings, wherein.

Figure 1A:
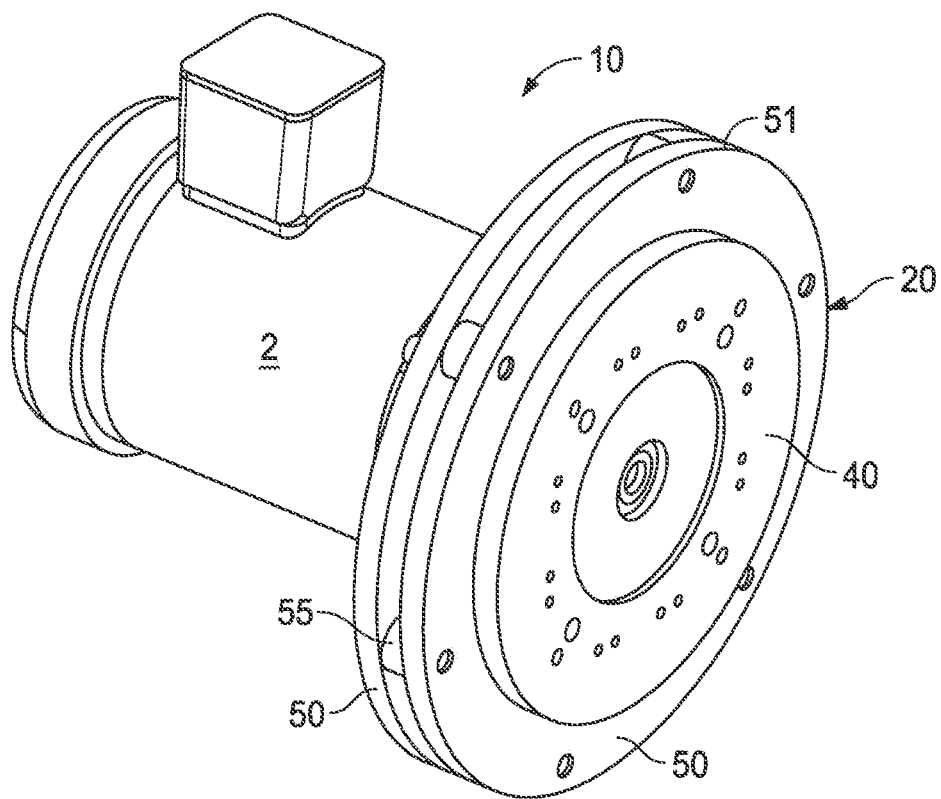
FIG. 1A is a perspective view of a first embodiment of a gearbox mechanism attached to a power source as previously disclosed in co-pending application Ser. No. 16/194,053, the disclosure of which is fully incorporated herein by reference.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1B:
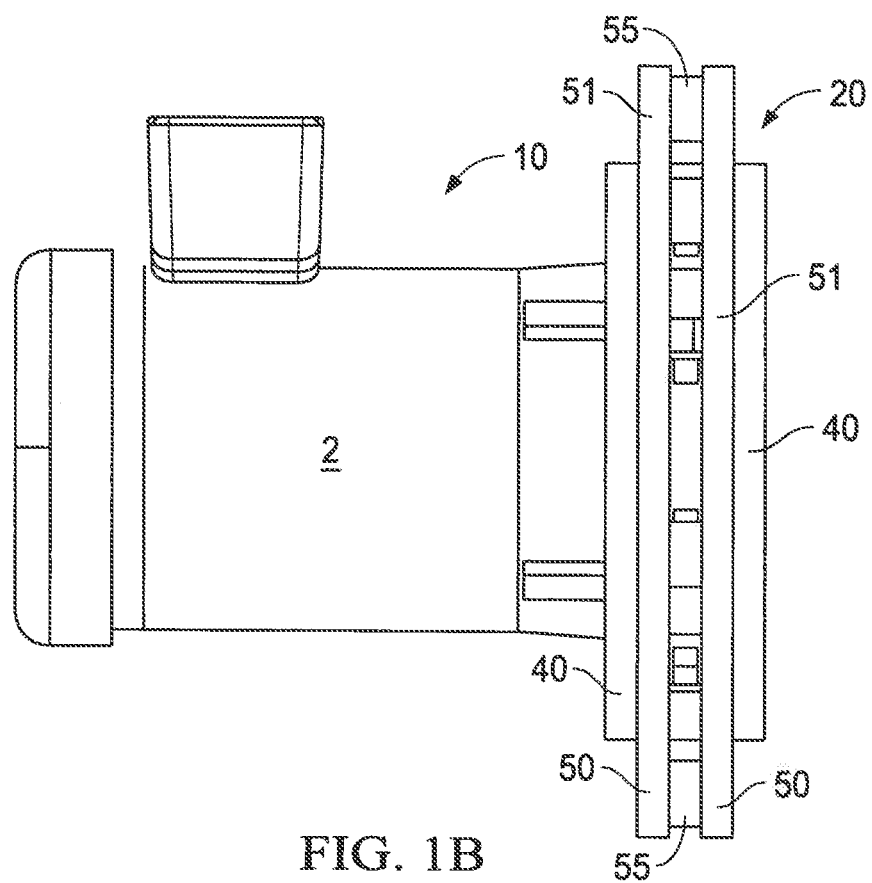
FIG. 1B is a side elevation view thereof.
Figure 2:
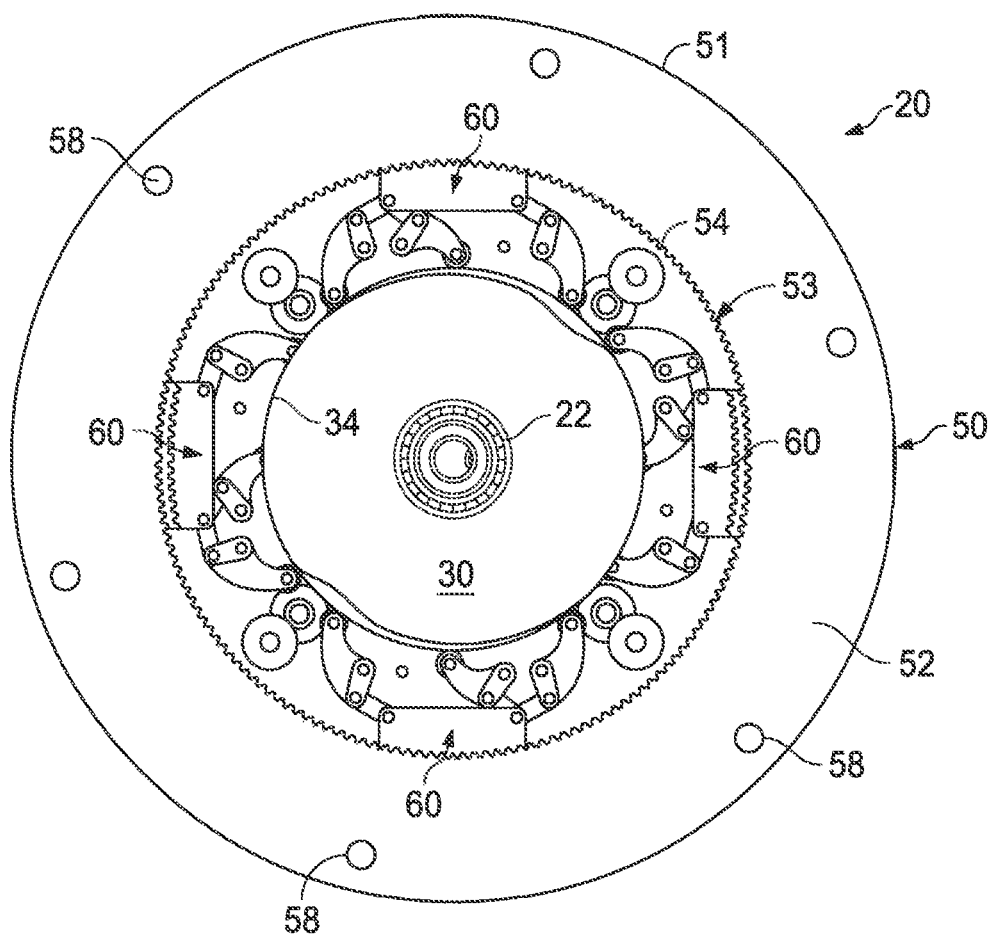
FIG. 2 is an end view thereof with the outer stationary plate removed.

With reference to the Figures, and in particular FIGS. 1A, 1B and 2, an embodiment of a machine 10 utilizing a gearbox mechanism 20 is depicted as previously disclosed in co-pending application Ser. No. 16/194,053, the disclosure of which is fully incorporated herein by reference. The machine 10 includes a power source or actuator 2, which includes an output device (not illustrated) that transmits the power generated by the power source 2. While the embodiment shown in the Figure generally depicts the power source 2 as an electric motor and the output device as an output shaft of the electric motor, it is understood that there are numerous possible embodiments. For example, output device need not be directly connected to the power source 2 but may be rotatively coupled by means of gears, chains, belts or magnetic fields. Likewise, the power source 2 may comprise an electric motor, an internal combustion engine, or any conventional power source that can be adapted to generate rotative power in an output device. Moreover, the power source 2 may also comprise the output gear of a preceding gear train mechanism.

As shown in the embodiment depicted in FIGS. 1A, 1B and 2, the plurality of cam-actuated gear block assemblies 60 transfer power from the power shaft 4 to an annular secondary or output gear element 50. In a preferred embodiment, each gear block assembly 60 includes a gear block 62 having an interface surface 63 (e.g., a plurality of projections or teeth 66) which correspond to a complementary interface surface 54 (e.g., projections or gear teeth) configured on an inner circumferential surface 53 of the annular secondary or output gear element 50. It is understood that the interface between the gear block 62 and the inner circumferential surface 53 of the output gear element 50 of the present invention comprises not only the preferred gear teeth as depicted, but also any complementary arrangement such as pins and holes or even friction fit surfaces.

While the annular output or power gear element 50 is depicted as two circular rings held apart by spacer elements 55, it is understood that the output or power gear element 50 may comprise a single circular ring. The output or power gear element 50 includes apertures or holes 58 for attaching to an output shaft or power takeoff (not shown). In addition, it is understood that the outer circumference 51 of the output or power gear element 50 may also comprise a surface to interface with some other gear train mechanism.

The gear blocks 62 of the present invention are specifically designed to enable a greater surface area (e.g., greater number of gear teeth) to engage the output gear 50 at any given time, thereby spreading the stresses associated therein across a greater area. By dramatically increasing the contact area between the gear block 62 and the output gear 50 at any given time the mechanical stress level is significantly decreased. In addition, the gear block 62 assemblies of the present invention reduce backlash to zero and even pre-loaded conditions to create a tight connection between the power source 2 and the powered device. This is an extremely desirable feature especially for high vibration applications.

Moreover, because the stresses associated with engagement of the gear block 62 against the output gear 50 are distributed across a greater area, the gear block 62 may be manufactured of lighter weight materials, which are typically less expensive and easier to manufacture, with no degradation in reliability. For example, per Hertz Contact Theory a typical stress result for spur gears are in the range from 450 MPa to 600 MPa. High grade steels are the best fitted materials for handling such high stress levels. Other materials like low grade steel or aluminum will deform under the similar conditions. However, by distributing the stresses across a large area of contact in accordance with the gearbox mechanism of the present invention, the levels of stress under the similar conditions can be reduced to about 20 MPa. These low stress levels allow the gearbox mechanism of the present invention to be manufactured using low grade steels, aluminums or even plastics for the same application. By reducing its weight and size, the gearbox mechanism of the present invention is adaptable to a broad range of applications that were previously impractical because of weight and space limitations.

The cam assembly 30 is coupled to the power source 2 by means of the output device or power shaft (not illustrated). Thus, power generated by the power source 2 is transferred to the power shaft, which causes the cam assembly 30 to rotate about the central axis 6. The cam assembly 30 includes about its circumferential surface 34 a plurality of unique pathways or grooves which each interface with the cam follower element of a single linkage assembly of each gear block assembly 60 so that as the cam assembly 30 rotates, the movement of the gear block 62 is controlled in two dimensions in accordance with a certain design parameter. By varying the radius of the pathway or grooves on the cam assembly 30 the linkage assemblies of the gear block assembly 60 drive respective gear block 62 through a two-dimensional circuit in response to rotation of the cam assembly 30. Broadly speaking, the two-dimensional circuit includes urging the gear block to engage the output gear element 50 and move or rotate the output gear element 50 a specified quantum distance prior to disengaging from the output gear element 50, and returning back the specified quantum distance to again reengage the output gear element 50 once again and repeat the process. The travel path or circuit of each gear block 62 is controlled by adjusting the length and configuration of the various linkage assemblies and altering the pathways or grooves formed in the cam assembly 30.

In a preferred embodiment, each linkage mechanism includes two pivotally coupled connector arms. An upper connector arm includes a first pivot point that is pivotally coupled to its respective gear block 62 and a second pivot point pivotally coupled to a lower connector arm. The lower connector arm includes a cam follower element at its distal end that maintains contact with its respective pathway or groove formed in the cam assembly 30. The lower connector arm further includes a pivot point having a fixed axis of rotation relative to the central axis 6 of rotation of the cam assembly 30.

Figure 3:
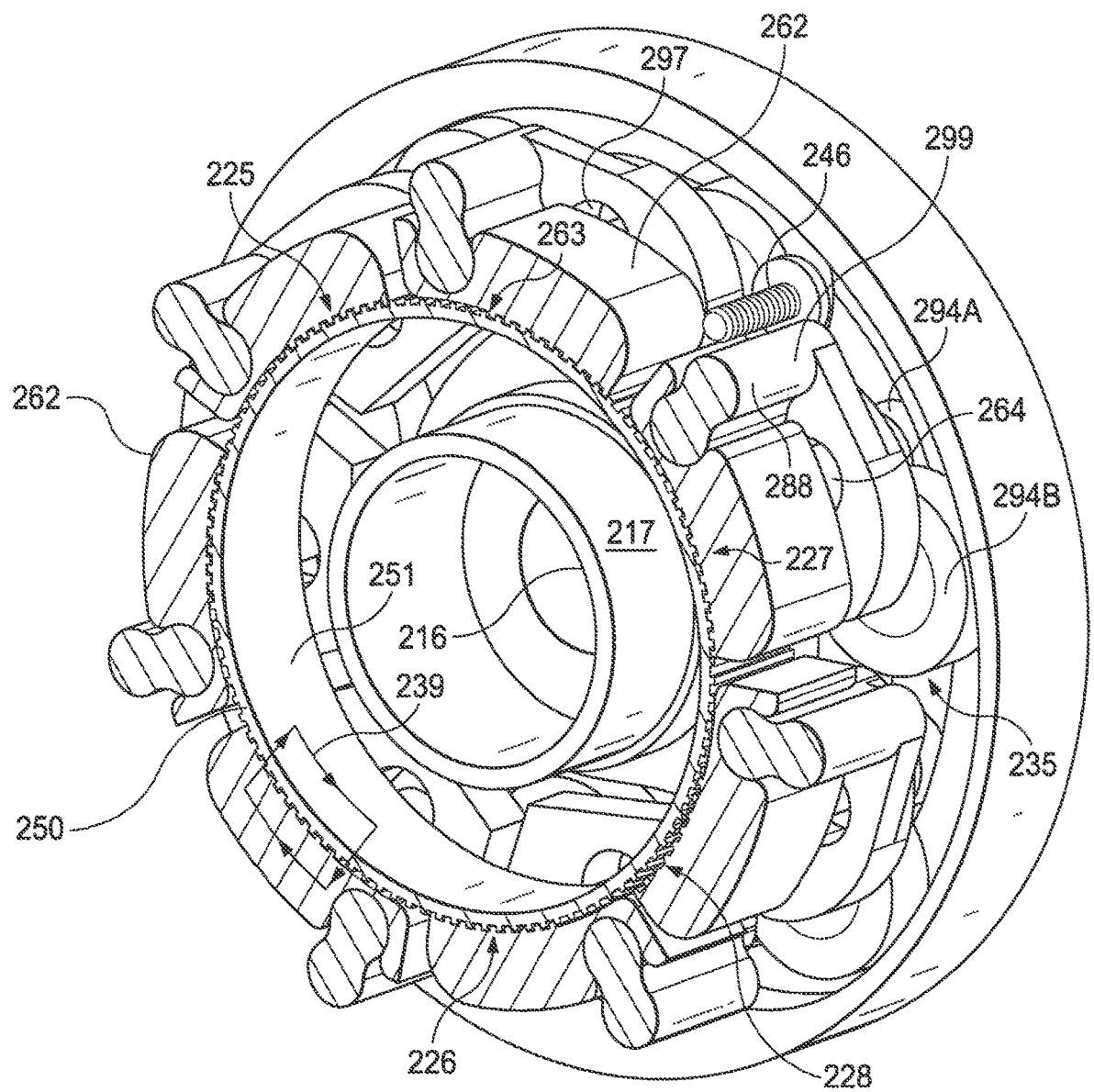
FIG. 3 is a perspective view of a second embodiment of a gearbox mechanism as previously disclosed in co-pending application Ser. No. 16/266,629, the disclosure of which is fully incorporated herein by reference.

With reference now to FIG. 3 an illustration of a second embodiment of a gearbox mechanism is depicted as previously disclosed in co-pending application Ser. No. 16/266,629, the disclosure of which is fully incorporated herein by reference. FIG. 3 depicts a perspective view of the gear block assemblies 260 interfacing with an output element 250 of the gearbox mechanism. The gear block assemblies 260 can include a gear block 262, a torque lever 299, a first cam follower 294A, and/or a second cam follower 294B. In at least one version the first cam follower 294A is coupled to the gear block 262, and the second cam follower 294B is coupled to the torque lever 299. As the cam followers 294A/294B traverse the first and second pathways 236/237 they generate radial and angular movements of the torque lever 299 and/or the gear block 262. These longitudinal and latitudinal movements of the torque lever 299 and/or gear block 262 allow for and/or generate the pivot movements of the torque lever 299, and/or gear block 262. In at least one example, a spacer 246 can be utilized to support and/or engage the torque lever 299.

The torque lever pivot post 288 and the gear block pivot void 297 interact to generate forces that cause the gear block 262 to engage and/or disengage from the output element 250. The movement of a gear block 262, in at least one example, is a cyclical, annular or closed loop movement that may have a generally rectangular, elliptical, circular, square, conical, oval, ovoid, truncated circular pattern, or any combination thereof, design specified pattern of movement.

For example, a gear block interface surface 263 can engage and/or disengage from an output element interface surface. The gear block 262 will move in a cyclical manner as a result of the pivot movements of the torque lever 299 and cam followers 294A/294B. In at least one version, the gear block can have four positions. A first position 228 (or transitioning position) allows for the gear block to traverse or move to a new position to begin a new rotation of the output element 250. The second position 226 (or engaged or positive bias movement position) allows for the gear block to generate a rotational or pulling force 228 on the output element 250. The third position 225 (or neutral or balanced position) may allow the gear block 262 to be in a position to engage, rotate, or disengage from the output element interface surface with no forces generated on the output element. The fourth position 227 (i.e., reverse tension or negative bias configuration) allows for a tension to be placed on the output element 250 to assist in the prevention and/or elimination of backlash of the output element 250.

The cam element guide 216 can be interfaced with the output element 250 through a rotational support, ball bearing assembly, and/or set of ball bearings (not illustrated) that can be placed between the cam element guide circumferential surface 217 and the output element circumferential surface 251.

As shown in the embodiment depicted in the Figures, the plurality of cam-actuated gear block assemblies 260 transfer power from an input or rotating device (not illustrated) to an output element 250. In a preferred embodiment, each gear block assembly 260 includes a gear block 262 having an interface surface 263 (e.g., a plurality of projections or teeth 266) which correspond to a complementary output element interface surface 254 (e.g., projections or gear teeth) configured on an outer circumferential surface 251 of the output element 250. The present invention comprises not only the preferred gear teeth as depicted, but also any complementary arrangement such as pins and holes or even friction fit surfaces.

While the output element 250 is depicted as a single circular ring, it is understood that the output element 250 may comprise two circular rings held apart by spacer elements (not illustrated). The output element 250 includes apertures or holes 258 for attaching to an output shaft or power takeoff (not illustrated). In addition, it is understood that the inner circumference 251 of the output element 250 may also comprise a surface to interface with some other gear train mechanism.

In addition, it is understood that the gear block 262 may include a divider/alignment block (not illustrated) dividing the interface surface 263 into two separate sections. The variant of the gear block 262 featuring the alignment block (not illustrated) is particularly suitable to embodiments which feature output elements 250 comprised of circular rings. The gear block 262 can have a gear block post 264 that may interact with a torque lever aperture 297 to provide a pivot point for the gear block 262 and/or torque lever 299.

The gear blocks 262 of the present invention are specifically designed to enable a greater surface area (e.g., greater number of gear teeth) to engage the output element 250 at any given time, thereby spreading the stresses associated therein across a greater area. By dramatically increasing the contact area between the gear block 262 and the output element 250 at any given time the mechanical stress level is significantly decreased. In addition, the gear block 262 assemblies 260 of the present invention reduce backlash to zero and even preloaded conditions to create a tight connection between the power source and/or the powered device (not illustrated). This is an extremely desirable feature especially for high vibration applications. Moreover, because the stresses associated with engagement of the gear block 262 against the output element 250 are distributed across a greater area, the gear block 262 may be manufactured of lighter-weight materials, which are typically less expensive and easier to manufacture, with no degradation in reliability.

The cam element 230 can be coupled to an input device, power source, or other rotating device (not illustrated) by means of a shaft, gears, belts, magnetic fields, friction fit, or other means of coupling. Power generated by an input device, power source, or other rotating device (not illustrated) can be transferred to a shaft, gears, belts, magnetic fields, friction fit, or other means of coupling, which causes the cam element 230 to rotate about the central axis 206. The cam assembly 230 includes along its planar surface a plurality of unique pathways or grooves which each interface with the cam follower(s) 294 of a gear block assembly 260 so that as the cam element 230 rotates, the movement of the gear block 262 is controlled in two dimensions in accordance with a certain design parameter. By varying the radius of the pathway or grooves on the cam element 230 the gear block assemblies 260 drive respective gear block(s) 262 through a two-dimensional circuit in response to rotation of the cam element 230. Broadly speaking, the two-dimensional circuit includes urging the gear block 262 to engage the output element 250 and move or rotate the output element 250 a specified distance prior to disengaging from the output element 250, and returning back the specified distance to again reengage the output element 250 once again and repeat the process. The travel path or circuit of each gear block 262 is controlled by adjusting the size, height, length and configuration of the torque lever(s) 299, gear block(s) 262, and/or cam follower(s) 294 and altering the pathways or grooves formed in the cam element 230.

For example, the pivotal connections may further include torsional spring elements (not shown) which bias the torque lever 299, and/or gear block 262 so that the cam follower 294 maintains contact with the surface of its respective pathway or groove 236, 237 formed in the planar surface 235 of the cam element 230 throughout the rotation cycle of the cam element 230. In one embodiment, the planar surface of the cam assembly 230 is substantially perpendicular to the axis of rotation of the cam assembly 230. Alternatively, or in addition, a ring spring connecting all of the gear blocks 262 in a gear train may be used as a biasing mechanism in accordance with the present invention.

The gear block assemblies 260 are biased and/or secured so that each cam follower 294 maintains contact with the surface of its respective pathway or groove formed in the cam element 230 throughout the rotation cycle of the cam element 230. For example, cam follower 294A maintains contact with the surface of a first pathway 236, and cam follow 294B maintains contact with the surface of a second pathway 237. Each pathway has a unique circumference, the radius of which varies over the course of the pathway.

By varying the radius of each pathway or groove 236, 237 on the cam element 230, torque lever(s) 299 drive their respective gear block(s) 262 through a two-dimensional circuit in response to rotation of the cam element 230. In general, the two-dimensional circuit 239 includes urging the gear block 262 to engage the output element 250 and move or rotate the output element 250 a specified distance prior to disengaging form the output element 250, and returning back the same specified distance to again reengage the output element 250 once again and repeat the process. It is understood that the two-dimensional circuit 239 depicted in the drawings is not to scale and is somewhat exaggerated to illustrate the general principal of the invention. For example, the distance A-B would typically be much smaller than depicted. The travel path or circuit 239 of each gear block 262 is controlled by adjusting the size and configuration of the torque lever(s) 299, gear block(s) 262, and/or altering the pathways or grooves 236, 237 formed in the cam element 230.

When adapted to a gearbox mechanism 220, a plurality of gear block assemblies 260 are configured about the central axis 206 of the cam element 230. The cam element 230, in at least one version, may be coupled to a power source (not illustrated) by an output device (not illustrated). As the cam element 230 rotates, the cam follower(s) 294 of the respective torque lever(s) 299 and/or gear block(s) 262 of each gear block assembly 260 maintain contact with a particular pathway or groove 236, 237 formed in the planar surface 235 of the cam element 230. The variance of distance from the center of rotation of the different pathways or grooves 236, 237 of the cam element 230 causes the torque lever(s) 299 pivotally attached to a cam follower(s) 194 to work in concert to move their respective gear block(s) 262 through a predetermined circuit of movement 239. This predetermined circuit of movement 239 of the gear block 260 can be precisely calibrated to meet specific engineering requirements. For example, the torque ratio and speed reduction may be regulated and controlled by adjusting the circuit of movement 239 of each gear block assembly 260.

Figure 4:
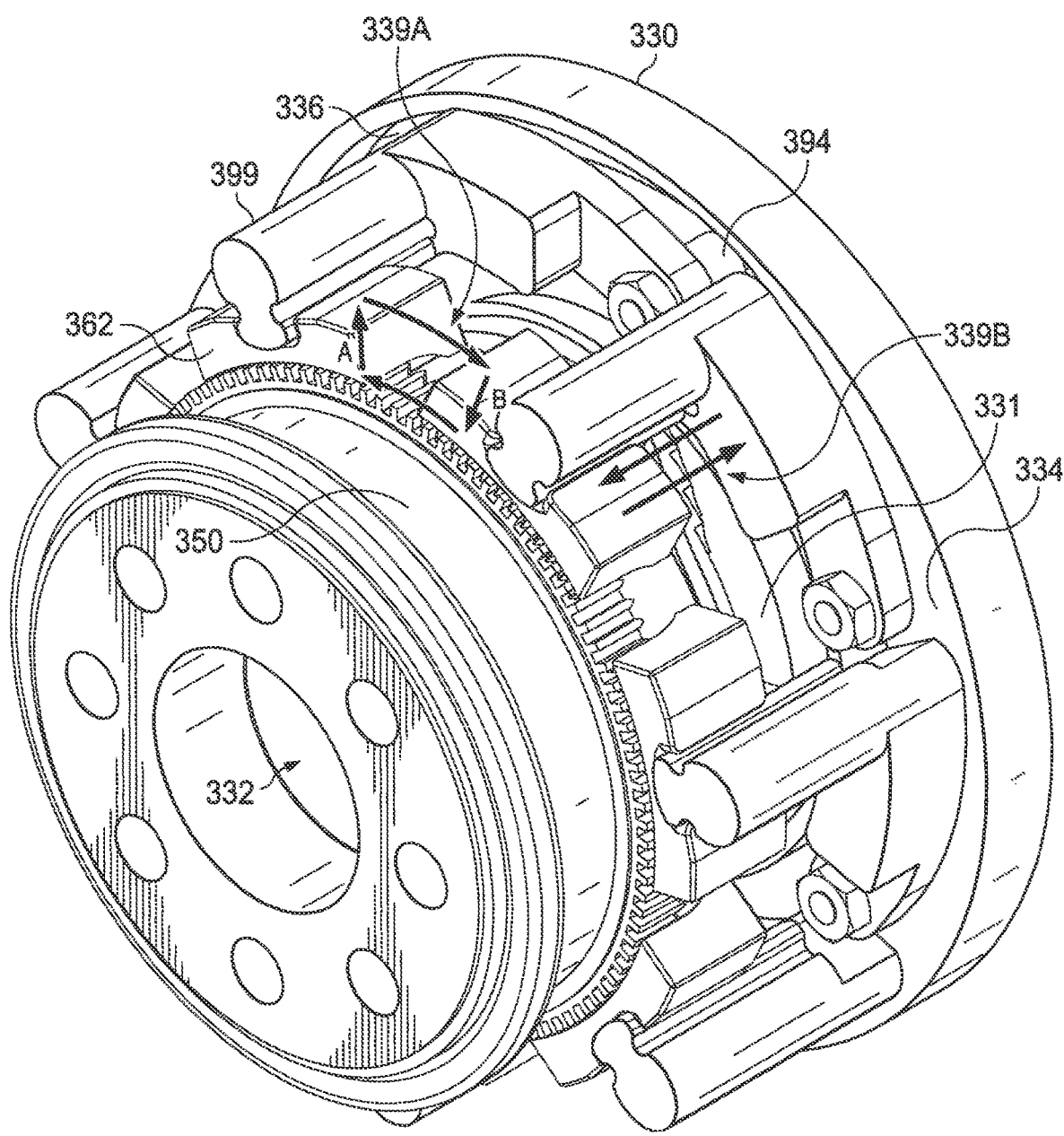
FIG. 4 is an illustration of a perspective view of an output element, cam element, and gear block assembly thereof.

With reference to the Figures, and in particular FIG. 4, a third embodiment of a gearbox mechanism 320 of the present invention is depicted. The gearbox mechanism 320 may be powered and/or rotated by a power source or actuator (as shown in FIGS. 1A and 1B), that is transmitted to an output device (not illustrated) by the gearbox mechanism 320. The power source can be an electric motor, combustion engine, water activated source, wind turbine, or other possible embodiments. Additionally, the power source or actuator, as well as the output device (not illustrated) may be rotatively coupled by means of gears, chains, belts, or magnetic fields.

The gearbox mechanism 320 can be configured about a central axis 306. The central axis 306 can pass through a central aperture of the main body 340, the output element 350, cam element 330, axial cam 331, and hub 314. The main body 340 and the hub 314 may be coupled together through fasteners 347. The fasteners 347 may be screws, bolts, all thread, compression fit devices, or other means for fastening two components together in a fixed or secure manner. There can be bearings, or roller bearings 307 that may separate each of the output element 350, axial cam 331, and cam element 330 from the main body 340 and/or the hub 314. In at least one example, there may also be bearings or roller bearings 307 that separate the output element and the axial cam 331.

In some embodiments, a cam assembly is created by coupling together the axial cam 331 and cam element 330 using fasteners like fasteners 302, wherein the axial cam 331 and cam element 330 interact with gear block assemblies. The fasteners 302 may be screws, bolts, all thread, compression fit devices, or other means for fastening axial cam 331 and cam element 330 together in a fixed or secure manner. The gearbox mechanism 320 further includes a plurality of gear block assemblies 360. Each gear block assembly 360 can include a rocker arm 399 (rocker arms 399A, 399B, 399C, 399D, 399E, 399F, and 399G collectively referred to as rocker arm(s) 399) that are coupled with the gear block(s) 362 (gear blocks 362A, 362B, 362C, 362D, 362E, 362F, and 362G may be referred to collectively as gear block(s) 362). The gear blocks 362 of the present invention are specifically designed to enable a greater surface area (e.g., greater number of gear teeth) to engage the output element 350 at any given time, thereby spreading the stresses associated therein across a greater area. By dramatically increasing the contact area between the gear block 362 and the output element 350 at any given time the mechanical stress level is significantly decreased. In some embodiments the gear block(s) 362 may have a pathway tracker that can, individually or in combination with a pathway follower element, track and/or follow a pathway formed into the axial cam 331. The pathway follower element can include a ball bearing, roller bearing, or other mechanism or means for reducing friction. In addition, the gear block assemblies 360 of the present invention reduce backlash to zero and even preloaded conditions to create a tight connection between the power source and/or the powered device (not illustrated). This is an extremely desirable feature especially for high vibration applications. Moreover, because the stresses associated with engagement of the gear block 362 against the output element 350 are distributed across a greater area, the gear block 362 may be manufactured of lighter-weight materials, which are typically less expensive and easier to manufacture, with no degradation in reliability.

For example, per Hertz Contact Theory, a typical stress result for spur gears, are in the range from 450 MPa to 600 MPa. High grade steels are the best fitted materials for handling such high stress levels. Other materials, like low grade steel or aluminum, will deform under the similar conditions. However, by distributing the stresses across large areas of contact in accordance with the gearbox mechanism of the present invention, the levels of stress under the similar conditions can be reduced to about 20 MPa. These low stress levels allow the gearbox mechanism of the present invention to be manufactured using low grade steels, aluminums or even plastics for the same application. By reducing its weight and size, the gearbox mechanism 320 of the present invention is adaptable to a broad range of applications that were previously impractical because of weight and space limitations.

In some embodiments, the rocker arm 399 can also have a cam follower 394 allowing for the following of a specified pathway(s) formed in or along a planar surface 334 of the cam element 330. While the planar surface 334 in FIG. 4, is depicted on the side of the cam element 330 facing the axial cam 331, it should be understood that the planar surface, into which pathway(s) 336 may be formed, may either face the axial cam 331 or face away from the axial cam 331. The gearbox mechanism 320 can also include a hub 314 and/or a ball bearing assembly 307 that allows the cam element 330 to rotate freely based upon an input device such as a shaft or rotatable elements such as a set of other gearing, belts, levers, magnetic or electrical fields, etc. In at least one example, there may be multiple ball bearing assemblies 307A, 307B, 307C, 307D, 307E, and/or 307F (collectively 307) that allow for reduced friction and freedom of movement for any rotational components. The interface surface 363 of each gear block 362 can engage with the output element interface surface 353 of the output element 350. In some embodiments, the gear blocks 362 are articulated by an associated movement of the rocker arm 399.

The cam element 330 includes at least one unique pathway or groove 336 that interfaces with the cam follower 394 of each rocker arm 399 so that as the cam element 330 rotates, the movement of the gear block 362 and/or rocker arm 399 is controlled in two dimensions in accordance with at least one certain design parameter. By varying the radius of the pathway or grooves 336 on the cam element 330, the gear block assemblies 360 drive their respective gear block(s) 362 through a two-dimensional circuit in response to rotation of the cam element 330. Broadly speaking, the two-dimensional circuit includes urging the gear block(s) 362 to engage the interface surface 353 of the output element 350 and move and/or rotate the output element 350 a specified distance prior to disengaging from the output element 350, and returning back the specified distance to again reengage the output element 350 once again, and repeat the process. The travel path or circuit of each gear block 362 is controlled by adjusting the length, width, height, and/or size of the respective gear block and/or rocker arm and/or by altering the pathways or grooves 336 formed in the cam element 330.

The rocker arm 399 is pivoted around a specific pivot point by the cam follower 394, which traverses the pathway 336 formed in the cam element 330. Additionally, the gear blocks 362 may also have a pathway tracker and/or pathway cam follower that follows a separate path along the axial cam 331 that also triggers an actuation point for the gear block(s) 362. In at least one embodiment, there is at least one pivot or actuation point for both the gear block(s) 362 and the rocker arm 399 that allows each to actuate or pivot separately from each other and while also moving in conjunction to create a specific pattern of movement for the gear block(s) 362. The movement of a gear block 362, in at least one example, is a cyclical, annular or closed loop movement that may have a generally rectangular, elliptical, circular, square, conical, oval, ovoid, truncated circular pattern, or any combination thereof, design specified pattern of movement.

With reference now to FIG. 4, a perspective view is depicted of the cam element 330, output element 350, along with the rocker arm 399, cam follower 394, and gear block 362. The axial cam 331 is also depicted; however, in this view, it is not easily seen. A central axis 306 can pass through the central aperture 332 at the center of the cam element 330, axial cam 331, and/or output element 350. In at least one embodiment of the present disclosure, the cam element 330 interacts with the rocker arm 399 along with the gear block 362 to rotate and cause a movement of the gear block 362 to have a cyclical, annular or closed loop movement having a generally rectangular, elliptical, circular, square, conical, oval, ovoid, truncated circular pattern, or any combination thereof, design specified pattern of movement based upon the pathways in the cam element 330 that may allow a cam follower 394 attached to the rocker arm 399 to traverse along the pathway 336 and generate movement of the gear block(s) 362.

Each of the cam followers 394 can each have a separate path or, in some embodiments, may have a single path that each follow at a different position simultaneously. The gear block(s) 362 can be pivotally connected to the rocker arm 399. Alternatively or in addition, a ring spring connecting all of the gear blocks 362 in a gear train may be used as a biasing mechanism in accordance with the present invention. In at least one embodiment of the present disclosure, the cam element will have a single pathway, however there may be multiple pathways formed in the cam element 330 that can be in the same plane where they are parallel paths, or pathways of different distances from the central axis 306, or the pathways can be in separate planes stacked in the direction of the central axis 306.

In at least one embodiment, the pathway 336 formed in cam element 330 allows for movement and rotation of the gear blocks 362 causing the interface surfaces of the gear blocks 362 to engage, interface and/or interact with the output element 350. Cam follower(s) 394 maintain contact with the surface of their respective pathways or grooves formed in the cam element 330. While the cam element 330 depicted in the Figures, appears to be a single disc or unit having at least one pathway or groove 336 formed in the planar surface 334 of the cam element 330, it is understood that the cam element 330 may also comprise a plurality of separate discs, each having a unique pathway formed in its planar surface (e.g., 334), which are mechanically coupled to one another to assemble a single cam assembly 330. In a preferred embodiment, the planar surface 334 of the cam assembly 330 is substantially perpendicular to the axis of rotation of the cam assembly 330. While the planar surface 334 depicted in FIG. 4 is shown as being on the side of the cam element 330 facing the axial cam 331, it should be understood that the planar surface, into which pathway(s) 336 is formed, may either face the axial cam 331 or face away from the axial cam 331.

For example, by varying the radius of the pathway or groove 336 on the cam element 330, the rocker arm 399 pivots about its pivot point to compensate and maintain contact between rocker arm 399 and the main body (not illustrated). This pivoting or moving of the rocker arm 399 about its pivot point induces movement in the pivotal connection with the gear block 362. Each rocker arm 399 acts independently of the other rocker arm(s) 399 due to the cam follower(s) 394 of each rocker arm 399 following and/or traversing the pathway 336 formed in the planar surface 334 of the cam element 330 at their respective distinct points.

As the cam followers 394 for the rocker arms 399 follow their respective pathway(s) 336, the rocker arm 399 can pivot at a specific point causing the gear block to pivot and/or rotate around a specific point. For example, the pivot point of the rocker arm 399 will trigger a left, right, in or out, or a rotational motion to the gear block 362. In general, the three-dimensional circuit may have a first portion 339A includes urging the gear block 362 to biasing the output element 350 and move or rotate the output element 350 a specified distance prior to releasing the biasing of the output element 350. Additionally, there may be an engagement and/or disengagement actuation that results in a second portion 339B of the three-dimensional circuit (i.e., collectively the first portion 339A and the second portion 339B create the three-dimensional circuit which will be referred to as 339). Associated together they allow for a cyclical, annular or closed-loop movement or circuit 339 of the gear block and the interfacing surface that has a generally rectangular, elliptical, circular, square, conical, oval, ovoid, truncated circular pattern, or any combination thereof, design specified pattern of movement. The cyclical, annular or closed-loop movement or circuit 339 of the gear block 362 can allow for a positive biasing of the output interface surface by the gear block interface surface that is translated into a forward rotation of the output element 350. Additionally, the gear block 362 can negatively bias the output element interface surface with the gear block interface surface in a manner that reduces the backlash or possible backlash of the output element and/or gear block. In at least one embodiment, there can also be a neutral biasing or position that allows the gear block 362 to not bias the output element 350 in a positive and/or negative manner, it may also in some example allow for the gear block 362 to release outwardly from the central axis.

Figure 5:
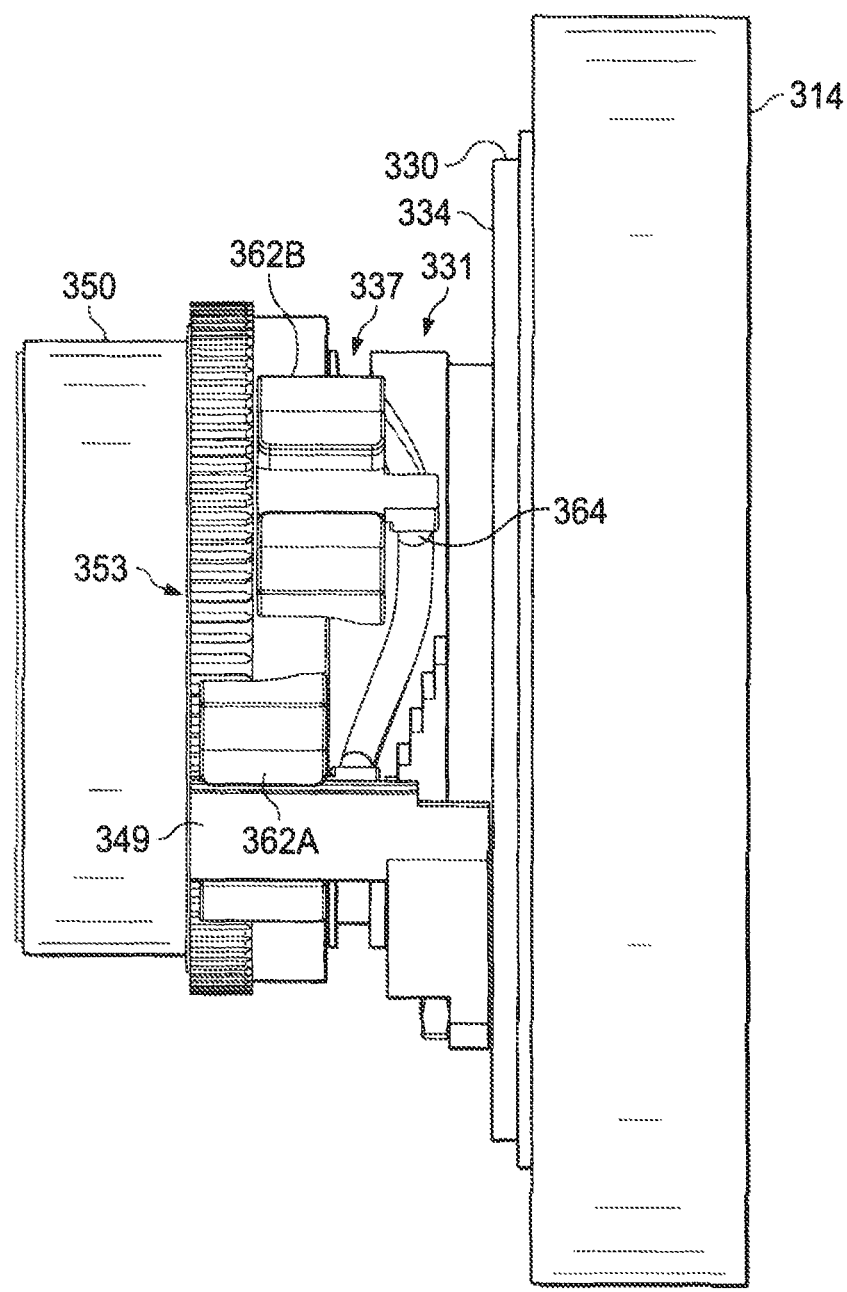
FIG. 5 is an illustration of a side view a hub, gear block assemblies, and output element thereof.

With reference now to FIGS. 4, and 5, additional illustrations of the third embodiment of a gearbox mechanism 320 of the present invention are depicted. By varying the radius of the pathway or groove 336 on the cam element 330, rocker arm(s) 399 drive their respective gear block(s) 362 through a two-dimensional circuit in response to rotation of the cam element 330. In general, the two-dimensional circuit 339A includes urging the gear block 362 to biasing the output element 350 and move or rotate the output element 350 a specified distance prior to releasing the biasing of the output element 350. Additionally, there may be an engagement and/or disengagement actuation that allows for the addition of a second portion 339B to the two-dimensional circuit. When the gear block is disengaged from the output element 350, the gear block 362 can be rotated and pivoted in a manner to allow it to move the interface surface in a direction opposite of the rotational movement of the output element 350, allowing the gear block 362 to return back the same specified distance to again reengage the output element 350 once again and repeat the process. It is understood that the two-dimensional circuit 339 depicted in the drawings is not to scale and is exaggerated to illustrate the general principal of the invention. For example, the distance A-B would typically be much smaller than depicted. The travel path or circuit 339A of each gear block 362 is controlled by adjusting the size and configuration of the rocker arm(s) 399, gear block(s) 362, and/or altering the pathway or groove 336 formed in the cam element 330.

Figure 7:
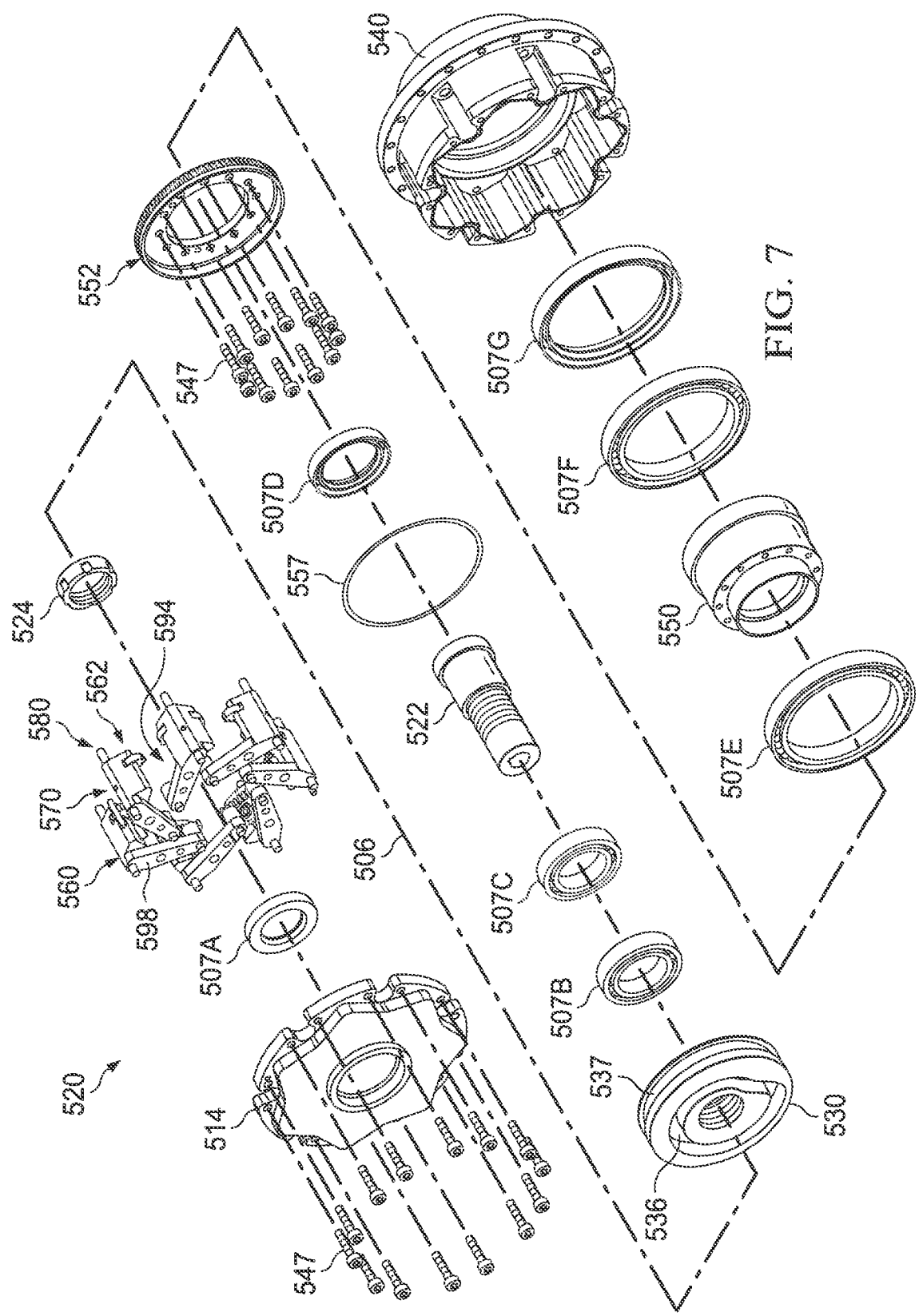
FIG. 7 is an illustration of an exploded perspective view of a fifth embodiment of a gearbox mechanism.
Figure 8:
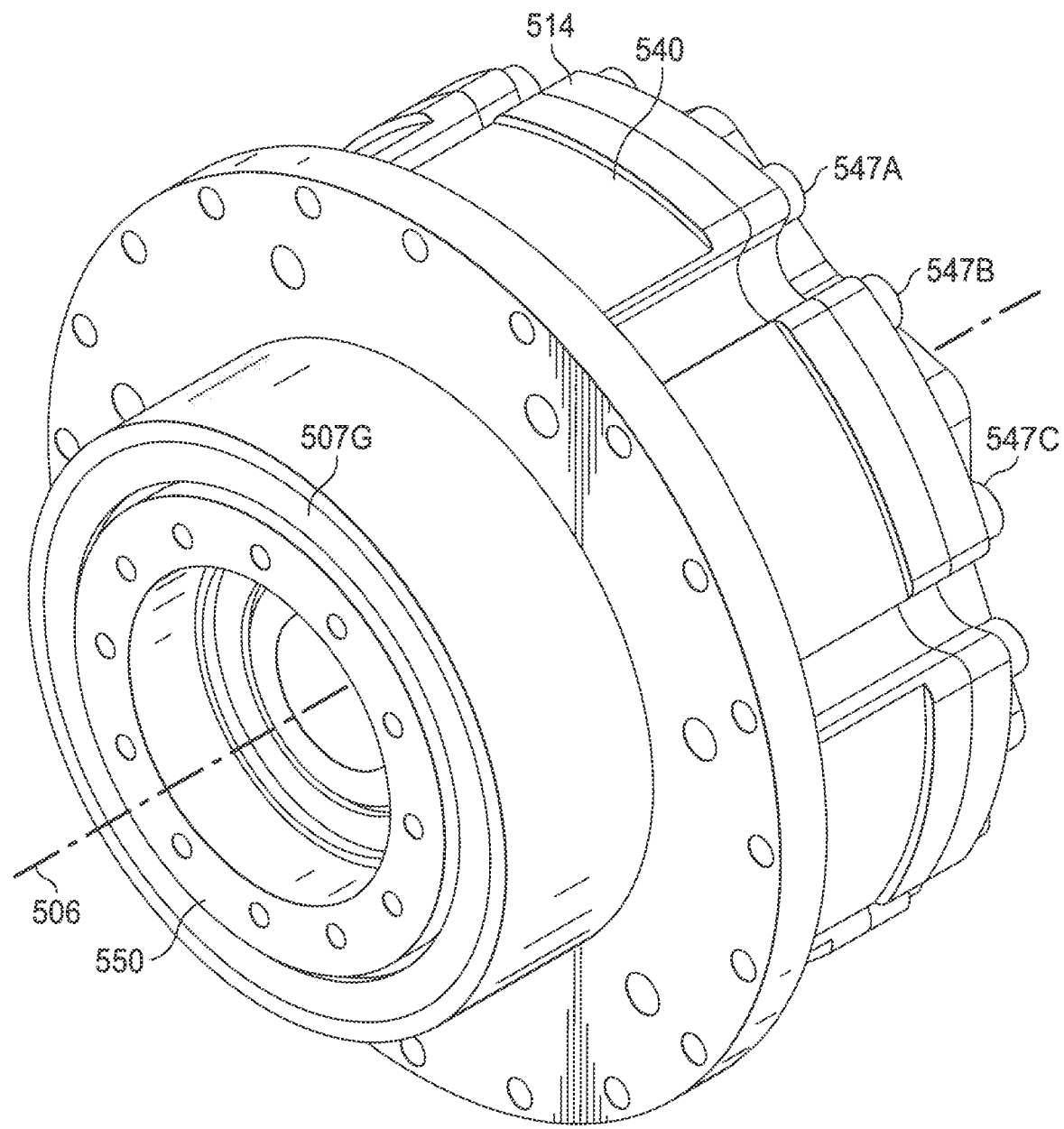
FIG. 8 is a perspective view illustration of a main body and lid of the gearbox mechanism shown in FIG. 7.

When adapted to a gearbox mechanism 320, a plurality of gear block assemblies 360 are configured about the central axis 306 that passes through the cam element 330. The cam element 330, in at least one version, may be coupled to a power source (not illustrated) by an output device (not illustrated). As the cam element 330 rotates, the cam follower(s) 394 of the respective rocker arms(s) 399 of each gear block assembly maintain contact with a particular pathway or groove 336 formed in the planar surface 334 of the cam element 330. In a preferred embodiment, the planar surface 334 of the cam assembly 330 is substantially perpendicular to the axis of rotation of the cam assembly 330. The variance of distance from the center of rotation to the different points along the pathway or groove 336 of the cam element 330 causes the rocker arm(s) 399, pivotally attached to a gear block(s) 362 to work in concert to move their respective gear block(s) 362 through a predetermined circuit of movement 339. This predetermined circuit of movement 339 of the gear block 362 can be precisely calibrated to meet specific engineering requirements. For example, the torque ratio and speed reduction may be regulated and controlled by adjusting the circuit of movement 339 of each gear block 362. An axial cam 331 rotates, in coordination with the cam element 330, and as they are rotated the pathway tracker 364 (see in particular FIGS. 7, 13 and 14) of the gear block 362 tracks along the axial pathway or groove 337. The axial pathway or groove 337 is formed in the circumferential surface 335 of the axial cam 331. The variance of height of the pathway towards or away from the lower section 333A of the axial cam 331, causes the gear block 362 to be engaged or disengaged from the interface surface 353 of the output element 350 with a linear movement (may also be called a second portion 339B of the three-dimensional circuit for the gear block 362). The movement of the gear block 362 may be created through two separate portions (339A/339B) that act in concert to generate a rotational (two dimensional movement in one plane (horizontal) a combination of left-right/in-out axial motions) movement and a linear movement in a vertical plane (up and down motions) that create the three dimensional circuit.

Numerous embodiments of gearbox mechanisms are possible using the gear block assembly of the present invention. All embodiments of gearbox mechanisms constructed in accordance with the present invention feature a plurality of gear block assemblies configured about the central axis 306 of the cam element 330 and may comprise either an odd or even number of gear block assemblies. At least two, and preferably three or more, gear block assemblies are required for a gearbox mechanism of the present invention. The movement of the gear block assemblies typically moves in a rotational series to one another.

However, in a preferred embodiment of the present invention wherein the plurality of gear block assemblies comprises four or more even-number gear block assemblies, the gear block assemblies configured on opposing sides of the cam element 330 engage and disengage in unison from the secondary or output element 350. For example, an embodiment of the gearbox mechanism 320 may feature four gear block assemblies 360. Similarly, another embodiment of the gearbox mechanism 320 may feature six gear block assemblies 360. This is accomplished by ensuring that the individual pathways or grooves formed in the planar surface of the cam element are in phase with one another along the planar surface of the cam element 330.

Figure 6:
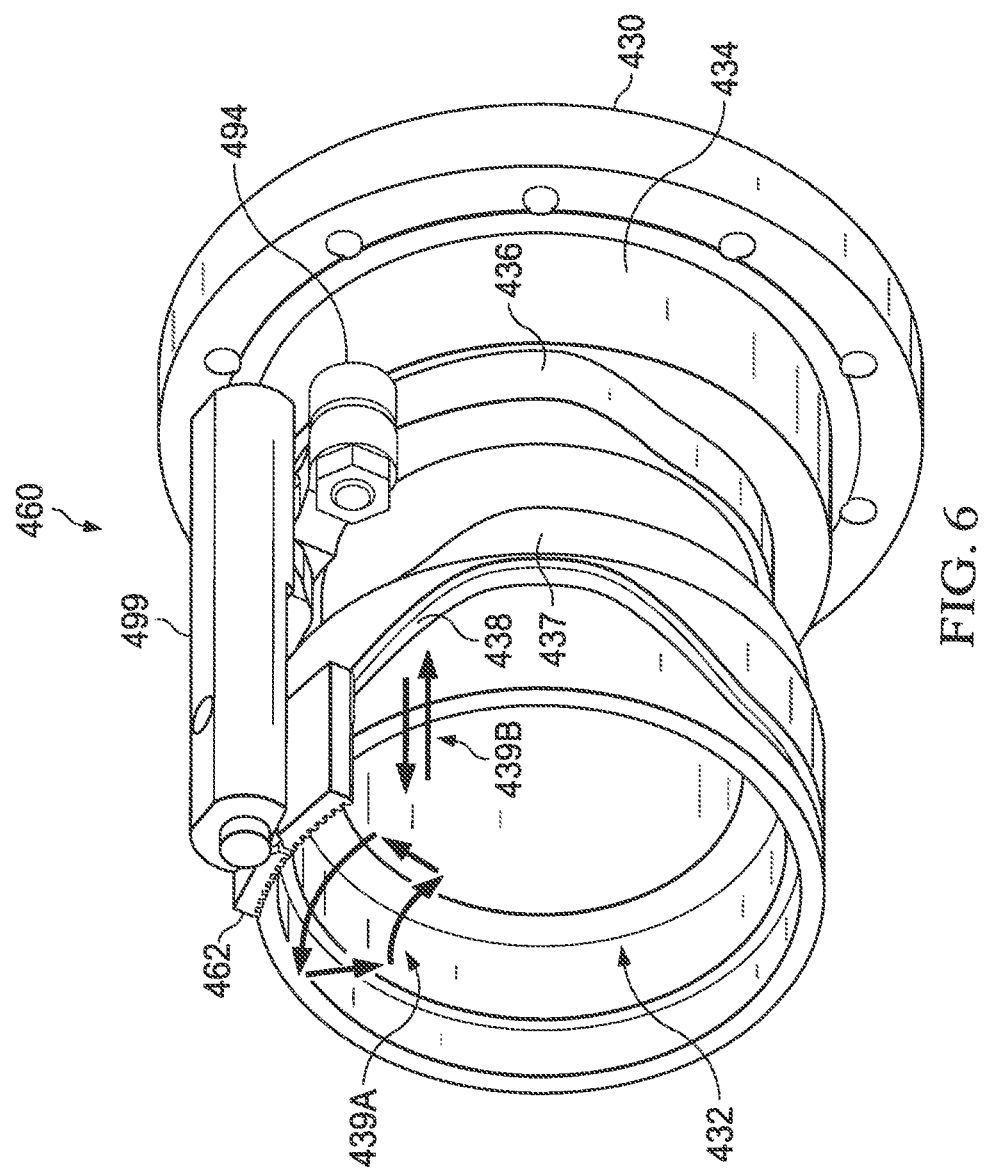
FIG. 6 is a perspective view illustration of a cam element and gear block assembly of the gearbox mechanism.

With reference again to the Figures, and in particular FIG. 6, a fourth embodiment of a gearbox mechanism 420 of the present invention is depicted. The gearbox mechanism 420 may be powered and/or rotated by a power source or actuator (as shown in FIGS. 1A and 1B), that is translated to an output device. The power source can be an electric motor, combustion engine, water activated source, wind turbine, or other possible embodiments. Additionally, the power source or actuator, as well as the output device may be rotatively coupled by means of gears, chains, belts, or magnetic fields.

The gearbox mechanism 420 can be configured about a central axis 406. The central axis 406 can pass through a central aperture of the main body 440, the output element 450, cam element 430, and hub 414. The hub 414 may include a ball bearing assembly (not illustrated) that allows the cam element 430 to rotate freely within the hub 414 based upon an input device such as a shaft or rotatable elements such as a set of other gearing, belts, levers, magnetic or electrical fields, etc. The main body 440 and the hub 414 may be coupled together with fasteners (not illustrated). The fasteners may be screws, bolts, all thread, compression fit devices, or other means for fastening two components together in a fixed or secure manner. The gearbox mechanism 420 may further include bearings such as roller bearings 407 that may separate each of the output element 450, and cam element 430 from the main body 440 and/or the hub 414. The gearbox mechanism 420 may also include a plurality of gear block assemblies 460. Each gear block assembly can include a rocker arm 499 (rocker arms 499A, 499B, 499C, 499D, 499E, 499F, and 499G collectively referred to as rocker arm(s) 499) that are coupled with the gear block(s) 462 (gear blocks 462A, 462B, 462C, 462D, 462E, and 462F may be referred to collectively as gear block(s) 462). In some embodiments the gear block(s) 462 may have a pathway tracker that can individually or in combination with a pathway follower element tracks and/or follows a pathway formed into the cam element 430.

The gear blocks 462 of the present invention are specifically designed to enable a greater surface area (e.g., greater number of gear teeth) to engage the output element 450 at any given time, thereby spreading the stresses associated therein across a greater area. By dramatically increasing the contact area between the gear block 462 and the output element 450 at any given time the mechanical stress level is significantly decreased. In addition, the gear block 462 of the present invention reduce backlash to zero and even preloaded conditions to create a tight connection between the power source and/or the powered device (not illustrated). This is an extremely desirable feature especially for high vibration applications. Moreover, because the stresses associated with engagement of the gear block 462 against the output element 450 are distributed across a greater area, the gear block 462 may be manufactured of lighter-weight materials, which are typically less expensive and easier to manufacture, with no degradation in reliability.

For example, per Hertz Contact Theory a typical stress result for spur gears are in the range from 450 MPa to 600 MPa. High grade steels are the best fitted materials for handling such high stress levels. Other materials like low grade steel or aluminum will deform under the similar conditions. However, by distributing the stresses across a large areas of contact in accordance with the gearbox mechanism of the present invention, the levels of stress under the similar conditions can be reduced to about 20 MPa. These low stress levels allow the gearbox mechanism of the present invention to be manufactured using low grade steels, aluminums or even plastics for the same application. By reducing its weight and size, the gearbox mechanism 420 of the present invention is adaptable to a broad range of applications that were previously impractical because of weight and space limitations.

In some embodiments, the rocker arm 499 can also have a cam follower 494 allowing for the following of a specified pathway(s) formed along a circumferential surface of the cam element 430. The interface surfaces 463 (see FIG. 23) of the gear block 462 can engage with the interface surface 452 of the output element 450. In some embodiments, the gear blocks are rotated by an associated movement of the rocker arm 499.

The cam element 430 includes at least one unique pathway or groove that interfaces with the cam follower 494 of the rocker arm 499 so that, as the cam element 430 rotates, the movement of the gear block 462 and/or rocker arm 499 is controlled in two dimensions in accordance with at least one certain design parameter. By varying the radius of the pathway or grooves on the cam element 430, the gear block assemblies drive respective gear block(s) 462 through a two-dimensional circuit in response to rotation of the cam element 430. Broadly speaking, the two-dimensional circuit includes urging the gear block(s) 462 to engage the output element 450 and move and/or rotate the output element 450 a specified distance prior to disengaging from the output element 450, and returning back the specified distance to again reengage the output element 450 once again, and repeat the process. The travel path or circuit of each gear block 462 is controlled by adjusting the length, width, height, and/or size of the respective gear block and/or rocker arm 499 and/or altering the pathways or grooves formed in the cam element 430.

The rocker arm 499 is pivoted around a specific pivot point by the cam follower 494, which traverses the path in the cam element 430 as the cam element 430 rotates. Additionally, the gear blocks 462 may also have a pathway tracker and/or pathway cam follower that follows a separate path along the cam element 430 that also triggers an actuation point for the gear block(s) 462. In at least one embodiment, there is at least one pivot or actuation point for both the gear block(s) 462 and the rocker arm 499 that allows each to actuate or pivot separately from each other and while also moving in conjunction to create a specific pattern of movement for the gear block(s) 462. The movement of a gear block 462, in at least one example, is a cyclical, annular or closed loop movement that may have a generally rectangular, elliptical, circular, square, conical, oval, ovoid, truncated circular pattern, or any combination thereof, design specified pattern of movement. In some embodiments, the main body 440 may be coupled with at least one hub 412A and/or 412B. In some examples, the hub(s) 412A and 412B may be coordinated With reference now to FIG. 6, a perspective view is depicted of the cam element 430, along with the rocker arm 499, cam followers 494, and gear block 462. The central axis 406 passes through the central aperture 432 at the center of the cam element 430. In at least one embodiment of the present disclosure, as it rotates the cam element 430 interacts with the rocker arm 499 along with the gear block 462 to cause the gear block 462 to have a cyclical, annular or closed loop movement having a generally rectangular, elliptical, circular, square, conical, oval, ovoid, truncated circular pattern, or any combination thereof, design specified pattern of movement based upon the pathways in the cam element 430 that may allow a cam follower 494 attached to the rocker arm 499 to traverse along the pathway and generate movement of the gear block(s) 462. In at least one embodiment, the cam follower(s) 494 may be coupled and/or attached to the rocker arm 499 through a rocker block 470 (see FIGS. 23 & 28).

Each of the cam followers 494 can each have a separate path or, in some embodiments, may have a single path that each follow at a different position simultaneously. The gear block(s) 462 can be pivotally connected to the rocker arm 499. Alternatively, or in addition, a ring spring connecting all of the gear blocks 462 in a gear train may be used as a biasing mechanism in accordance with the present invention. In at least one embodiment of the present disclosure, the cam element will have a single pathway, however there maybe multiple paths formed in the cam element 430 that can be in the same plane where they are parallel paths, or paths of different distances from the central axis 406, or the paths can be in separate planes stacked in the direction of the central axis 406.

Figure 17:
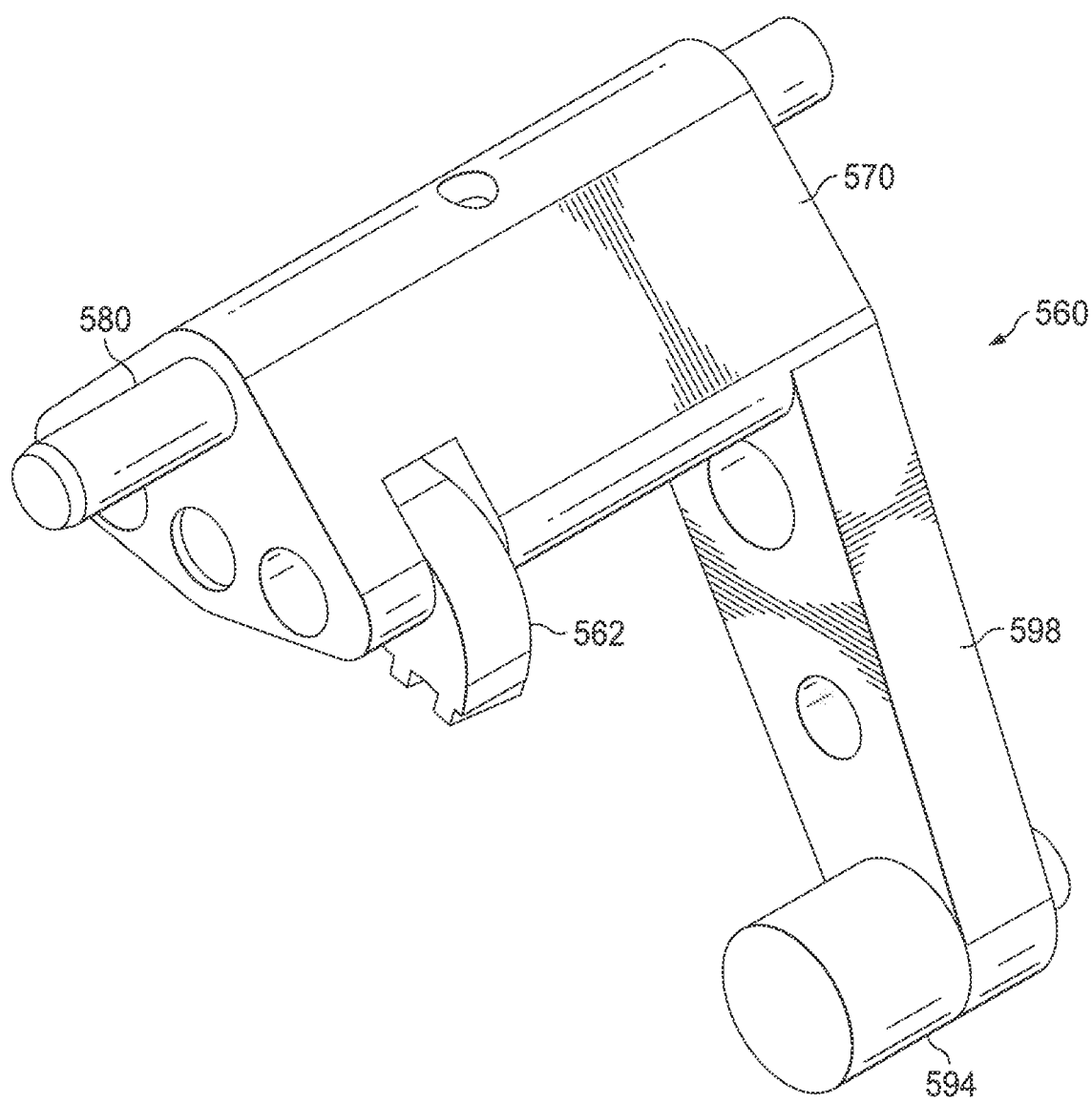
FIG. 17 is a perspective view illustration of a rocker block assembly of the gearbox mechanism shown in FIG. 7.

In at least one embodiment, the pathways 436, 437 along cam element 430 allows for movement and rotation of the gear blocks 462 causing the interface surfaces of the gear blocks 462 to engage, interface and/or interact with the output element 450 (FIG. 17). As the cam element 430 rotates, cam follower(s) 494 maintain contact with the surface of their respective pathways or grooves formed in the cam element 430. While the cam element 430 depicted in the Figures, appears to be a single unit having at least one pathway or groove formed in the circumferential surface 434 of the cam element 430, it is understood that the cam element 430 may also comprise a plurality of separate discs or tubes, each having a unique pathway formed in its circumferential surface 434, which are mechanically coupled to one another to assemble a single cam assembly 430.

For example, by varying the radius of the pathway or groove 436, 437 on the cam element 430, the rocker arm 499 pivots about its pivot point to compensate and maintain contact between rocker arm 499/cam follower 494 and the pathway 436, 437. This pivoting or moving of the rocker arm 499 about its pivot point induces movement in the pivotal connection with the gear block 462. Each rocker arm 499 acts independently of the other rocker arm(s) 499 due to the cam follower(s) 494 of each rocker arm 499 following and/or traversing the pathway 436, 437 formed in the circumferential surface of the cam element 430 at their respective distinct points.

As the cam followers 494 for the rocker arms 499 follow their respective pathway(s) 436, 437 the rocker arm 499 can pivot at specific point causing the gear block to pivot and/or rotate around a specific point. For example, the pivot point of the rocker will trigger a left, right, in or out, or a rotational motion to the gear block 462. Associated together they allow for a cyclical, annular or closed-loop movement of the gear block and the interfacing surface that has a generally rectangular, elliptical, circular, square, conical, oval, ovoid, truncated circular pattern, or any combination thereof, design specified pattern of movement. For example, the pivot point of the rocker arm 499 will trigger a left, right, in or out, or a rotational motion to the gear block 462. In general, the two-dimensional circuit may have a first portion 439A includes urging the gear block 462 to biasing the output element (not illustrated) and move or rotate the output element (not illustrated) a specified distance prior to releasing the biasing of the output element. Additionally, there may be an engagement and/or disengagement actuation that allows for a second portion 439B of the two-dimensional circuit 439. Associated together they allow for a cyclical, annular or closed-loop movement or circuit 439 of the gear block and the interfacing surface that has a generally rectangular, elliptical, circular, square, conical, oval, ovoid, truncated circular pattern, or any combination thereof, design specified pattern of movement. The cyclical, annular or closed-loop movement or circuit 439 of the gear block 462 can allow for a positive biasing of the output interface surface by the gear block interface surface that is translated into a forward rotation of the output element 350. Additionally, the gear block 462 can negatively bias the output element interface surface with the gear block interface surface in a manner that reduces the backlash or possible backlash of the output element and/or gear block. In at least one embodiment, there can also be a neutral biasing or position that allows the gear block 462 to not bias the output element in a positive and/or negative manner, it may also in some example allow for the gear block 462 to release outwardly from the central axis.

With reference to the Figures, and in particular FIGS. 7-22, a fifth embodiment of a gearbox mechanism 520 of the present invention is depicted. The gearbox mechanism 520 may be powered and/or rotated by a power source or actuator (as shown in FIGS. 1A and 1B), that is transmitted to an output device (not illustrated) by the gearbox mechanism 520. The power source can be an electric motor, combustion engine, water activated source, wind turbine, or other possible embodiments. Additionally, the power source or actuator, as well as the output (not illustrated) may be rotatively coupled by means of gears, chains, belts, or magnetic fields to the gearbox mechanism 520. The gearbox mechanism 520 allows for engagement of the rocker block assembly with a cam 530, have pathways formed in multiple planes, and create a multi-plane cam actuated gearbox mechanism 520.

The gearbox mechanism 520 can be configured about a central axis 506. The central axis 506 can pass through a central aperture of the main body 540, the output device 550, cam 530, output gear 552, and lid 514. The main body 540 and the lid 514 may be coupled together through fasteners 547 (shown as fasteners 547A, 547B, and 547C). The fasteners 547 may be screws, bolts, all thread, compression fit devices, or other means for fastening two components together in a fixed or secure manner. There can be friction reducing mechanisms 507 such as but not limited bearings, roller bearings, that can be sealed or unsealed, that may separate each of the output gear 552 and cam 530 from the main body 540 and/or the lid 514. In at least one example, there may also be friction reducing mechanisms 507 that separate the output device from the main body 540 and/or the lid 514. In some examples, the friction reducing mechanism 507 may include oil seals, as example of this could be 507F and 507G, where 507F is a bearing or roller bearing and 507G is an oil seal to provide a seal and allow for a friction reducing fluid to be utilized. Other examples, can have self-sealing or sealed bearings or roller bearings. In at least one embodiment, 507A and 507G represent friction reducing mechanisms that act as seals or oil seals to allow a friction reduction fluid or material, such as but not limited to grease, to be utilized within the gearbox mechanism 520.

The gearbox mechanism 520 further includes a set of rocker block assemblies 560. Each rocker block assembly 560 allows for a set of pathway tracking devices coupled to the rocker block assembly 560 to track along the pathways form into the cam 530. The gear pad of the rocker block assembly 560 are specifically designed to enable greater surface area (e.g., greater number of gear teeth) to engage the output gear 552 at any given time, thereby spreading the stresses associated therein across a greater area. By dramatically increasing the contact area between the gear pad 562 and the output gear 552 at any given time the mechanical stress level is significantly decreased. In some embodiments the rocker block assemblies 560 may have a pathway tracker that can, individually or in combination with a pathway follower element, track and/or follow a pathway formed into the cam 530. The pathway follower element can include a ball bearing, roller bearing, or other mechanism or means for reducing friction. In addition, the rocker block assemblies 560 of the present invention reduce backlash to zero and even preloaded conditions to create a tight connection between the power source and/or the powered device (not illustrated). This is an extremely desirable feature especially for high vibration applications. Moreover, because the stresses associated with engagement of the gear pad 562 against the output gear 552 are distributed across a greater area, the gear pad 562 may be manufactured of lighter-weight materials, which are typically less expensive and easier to manufacture, with no degradation in reliability. Additionally, because of the modular nature of the gearbox mechanism 520, the output gear 552, the gear pad 562, and the cam 530 may be exchanged to create various combinations capable of supporting any number of loads, gear ratios, friction, or speed, design requirements. The rocker block assemblies 560 in combination with the cam 530, can cause the output gear 552 to move or rotate a specified distance. By varying the internal pathway 536 and external pathway 537 of the cam 530, in broad term, drive the rocker block assemblies 560 through a three-dimensional circuit that includes urging the output gear 552. The movement of the rocker block assembly 560, in at least one example, is a cyclical, annular or closed loop movement that may have a generally rectangular, elliptical, circular, square, conical, oval, ovoid, truncated circular pattern, or any combination thereof, design specified pattern of movement.

For example, per Hertz Contact Theory, a typical stress result for spur gears, are in the range from 450 MPa to 600 MPa. High grade steels are the best fitted materials for handling such high stress levels. Other materials, like low grade steel or aluminum, will deform under the similar conditions. However, by distributing the stresses across large areas of contact in accordance with the gearbox mechanism of the present invention, the levels of stress under the similar conditions can be reduced to about 20 MPa. These low stress levels allow the gearbox mechanism of the present invention to be manufactured using low grade steels, aluminums or even plastics for the same application. By reducing its weight and size, the gearbox mechanism 520 of the present invention is adaptable to a broad range of applications that were previously impractical because of weight and space limitations.

As shown in the embodiment depicted in the Figures, the plurality of cam-actuated rocker block assemblies 560 transfer power from an input or rotating device 522 to an output device 550. In a preferred embodiment, each rocker block assembly 560 includes a gear pad 562 having an interface surface (e.g., a plurality of projections or teeth shown in FIG. 18) which correspond to a complementary output gear interface surface 553 (e.g., projections or gear teeth) configured on an outer circumferential surface 551 of the output gear 552. In at least one embodiment, the output gear 552 is coupled through fasteners to the output device 550. The present invention comprises not only the preferred gear teeth as depicted, but also any complementary arrangement such as pins and holes or even friction fit surfaces.

While the output device 550 is depicted as a single cylinder, it is understood that the output device 550 may comprise two or more circular rings held apart by spacer elements (not illustrated). The output device 550 includes apertures or holes (shown as apertures or holes 559 in FIG. 10) for attaching to an output shaft or power takeoff (not illustrated). In addition, it is understood that the inner circumference of the output device 550 may also comprise a surface to interface with some other gear train mechanism.

In addition, it is understood that the gear pad 562 may include a divider/alignment block (not illustrated) dividing the interface surface (shown in FIG. 18) into two separate sections. The variant of the gear pad 562 featuring an alignment block (not illustrated) is particularly suitable to embodiments which feature output device 550 comprised of circular rings.

The cam 530 can be coupled to an input device 522, power source, or other rotating device (not illustrated) by means of a shaft, gears, belts, magnetic fields, friction fit, or other means of coupling. Power generated by an input device 522, power source, or other rotating device can be transferred to a shaft, gears, belts, magnetic fields, friction fit, or other means of coupling, which causes the cam 530 to rotate about the central axis 506. In some embodiments, a cam assembly is created by coupling together the input device 522, cam 530, and cam nut 524. The cam 530 and the input device 522 can be axially engaged and secured together with the cam nut 524. The cam 530 interacts with a set of rocker block assemblies 560 to facilitate an organized conversion of rotational energy. The cam 530 can have a plurality of unique pathways or grooves formed along its circumferential and planar surfaces which each interfaces the cam followers (shown as cam follower 594 and/or pathway follower 574 in FIG. 18) of the rocker block assemblies 560 so that as the cam 530 rotates, the movement of the rocker block assembly 560 is controlled in three dimensions in accordance with a certain set of design parameters. In at least one example, one or more friction reducing mechanisms 507 (shown as 507A, 507B, 507C, 507D, 507E, 507F, and 507G) may be utilized between the cam assembly, the rocker block assembly 560, or output assembly 549. The friction reducing mechanisms 507 can include, in at least one example, one or more bearings or roller bearings 507B, 507C, 507E, and 507F, as well as one or more oil seals 507A, 507D, and 507G. The oil seals allow for the bearings or roller bearings to be filled or interact with a friction reducing fluid. Other examples may include, one or more self-sealing or sealed bearings or roller bearings. Some examples may include the seal and bearing separated by a measurable distance to allow for the bearing to interact with a mechanism or device, and allow for a friction reducing fluid to freely move between the bearing, the seal, and the mechanism or device. The main body 540 may have rocker block indentions 577 that allow for the rocker block assemblies 560 rock, pivot, or other move in accordance with movements or actions of the input device 522, or cam 530. The main body 540 may also include a pivot pin aperture 543 that allows for receiving a pivot pin of the rocker block assemblies 560.

By varying the radius of each pathway or groove 536, 537 on the cam 530, rocker block assemblies 560 drive their respective gear pad(s) 562 through a three-dimensional circuit in response to rotation of the cam 530. In general, the three-dimensional circuit (Shown in FIGS. 20-22) includes urging the rocker block assemblies 560 to engage the output device 550 or output gear 552 and move or rotate the output device 550 or output gear 552 a specified distance prior to disengaging from the output device 550 or output gear 552, and returning back the same specified distance to again reengage the output device 550 or output gear 552 once again and repeat the process.

When adapted to a gearbox mechanism 520, a plurality of rocker block assemblies 560 are configured about the central axis 506 of the cam 530. The cam 530, in at least one version, may be coupled to a power source (not illustrated) by an input device 522. The variance of distance from the center of rotation (central axis 506) of the different pathways or grooves 536, 537 of the cam element 530 causes rocker block assemblies 560 to work in concert to move their respective gear pad(s) 562 through a predetermined circuit of movement. This predetermined circuit of movement of the gear pad 562 can be precisely calibrated to meet specific engineering requirements. For example, the torque ratio and speed reduction may be regulated and controlled by adjusting the circuit of movement of each rocker block assembly 560.

For example, the pivotal connections may further include torsional spring elements (not shown) which bias rocker block assemblies 560 so that a cam follower (shown as cam follower 594, or pathway follower 574 in FIG. 18) maintains contact with the surface of its respective pathway or groove 536, 537 formed in the circumferential or planar surface of the cam 530 throughout the rotation cycle of the cam element 530. In one embodiment, the planar surface of the cam 530 is substantially perpendicular to the axis of rotation of the cam 530. Alternatively, or in addition, a ring spring connecting all of the rocker block assemblies 560 in a gear train may be used as a biasing mechanism in accordance with the present invention.

The rocker block assemblies 560 are biased and/or secured so that each cam follower 594 (shown as cam follower 594, or pathway follower 574 in FIG. 18) maintains contact with the surface of its respective pathway or groove formed in the cam 530 throughout the rotation cycle of the cam 530. For example, cam follower 594 maintains contact with the surface of a first or internal pathway 536, and pathway follower (shown in FIG. 18) maintains contact with the surface of a second or external pathway 537. Each pathway has a unique circuit, the radius or height of which varies over the course of the pathway.

In at least one embodiment, the output gear 552 is coupled to the output device 550 through a set of fasteners 547. The fasteners 547 allow for the output gear 552 to be changed to account for various design characteristics or load modifications. The main body 540 may also be coupled to the lid 514 through a set of fasteners 547 that can be received at a set of securing apertures 544. In at least one example, each of the main body 540, lid 514, friction reduction mechanisms 507, input device 522, cam 530, cam nut 524, output gear 552, and output device 550 have a central aperture that allows for a central axis 506 to pass through each of the said components. Each of these elements may be co-axially aligned along the central axis, in a manner that allows the elements to form a linear assembly along the length of the central axis 506.

Figure 9:
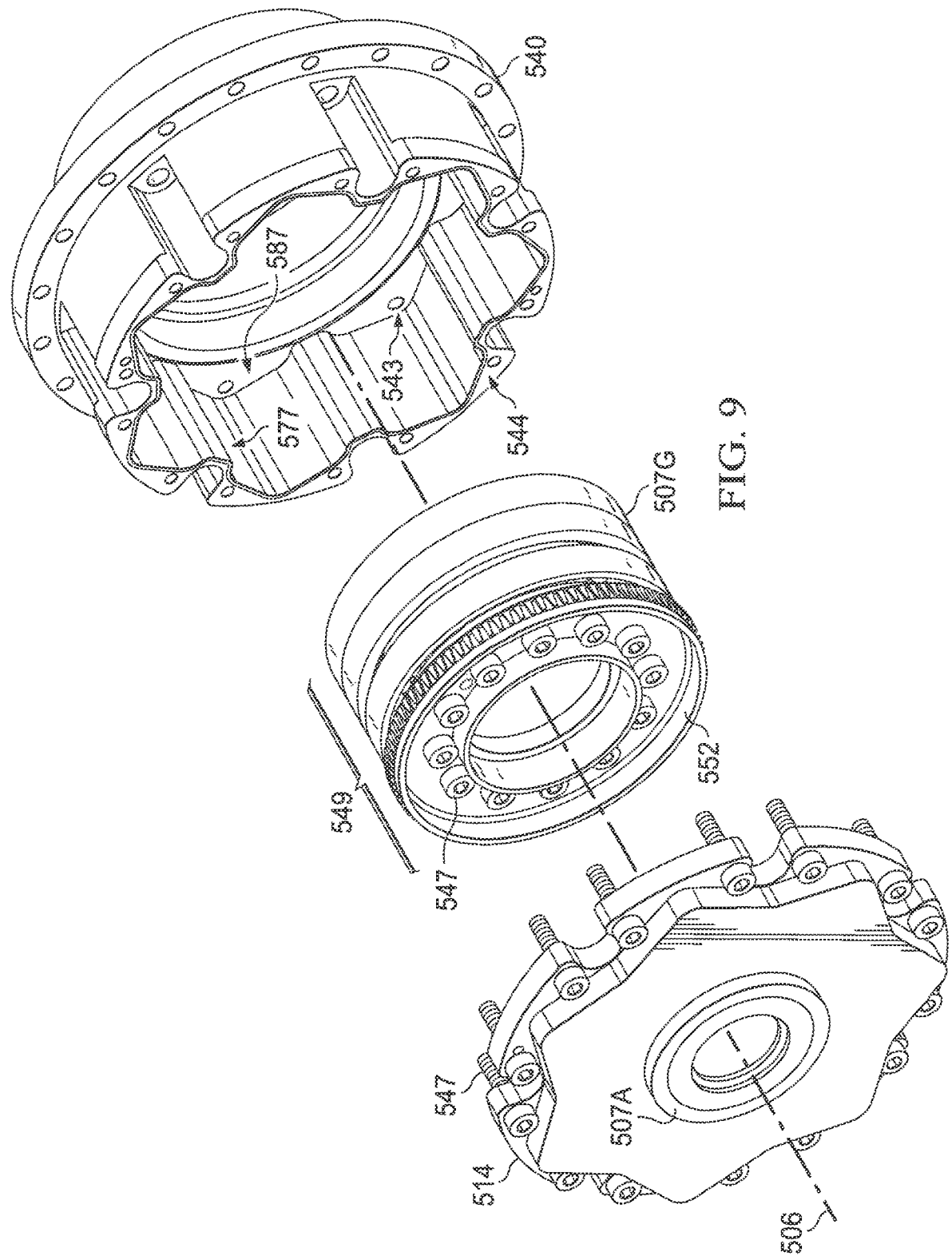
FIG. 9 is an exploded perspective view illustration of a main body, output assembly, and lid of the gearbox mechanism shown in FIG. 7.

With reference now to FIG. 9, an exploded view of a main body 540, lid 514, and output assembly 549 is shown. The main body 540, in at least one version, can provide a housing for the rocker block assemblies (shown in FIG. 18). The rocker block assemblies (shown in FIG. 18) can rest and/or be supported by the main body retaining surface 587. The rocker arm(s) (shown in FIG. 18) may be supported and/or retained by the rocker block indention 577 as defined by the main body 540. For example, the rocker block indention 577 may be sized to retain and prevent the rocker block assemblies (not illustrated) from being removed except in a single direction that is perpendicular to the pivoting motion that the rocker block(s), while the pivoting motion of the rocker block(s) (shown in FIG. 18) can also coincide with a pivoting motion of the rocker block arm(s) (shown in FIG. 18) that allows for the interfacing, engaging, and/or rotating of an output gear or output device (shown in FIG. 7). The main body 540 can be coupled to a lid 514, input hub, a retainer, or other securing devices via a fastener 547 sized to fit into a securing aperture 544 defined by the main body 540. The lid 514, input hub, retainer, or other securing devices, in at least one example, can be utilized to secure and/or support a cam (shown in FIG. 14) in a manner to prevent vibration but allow free movement of the cam.

Figure 10:
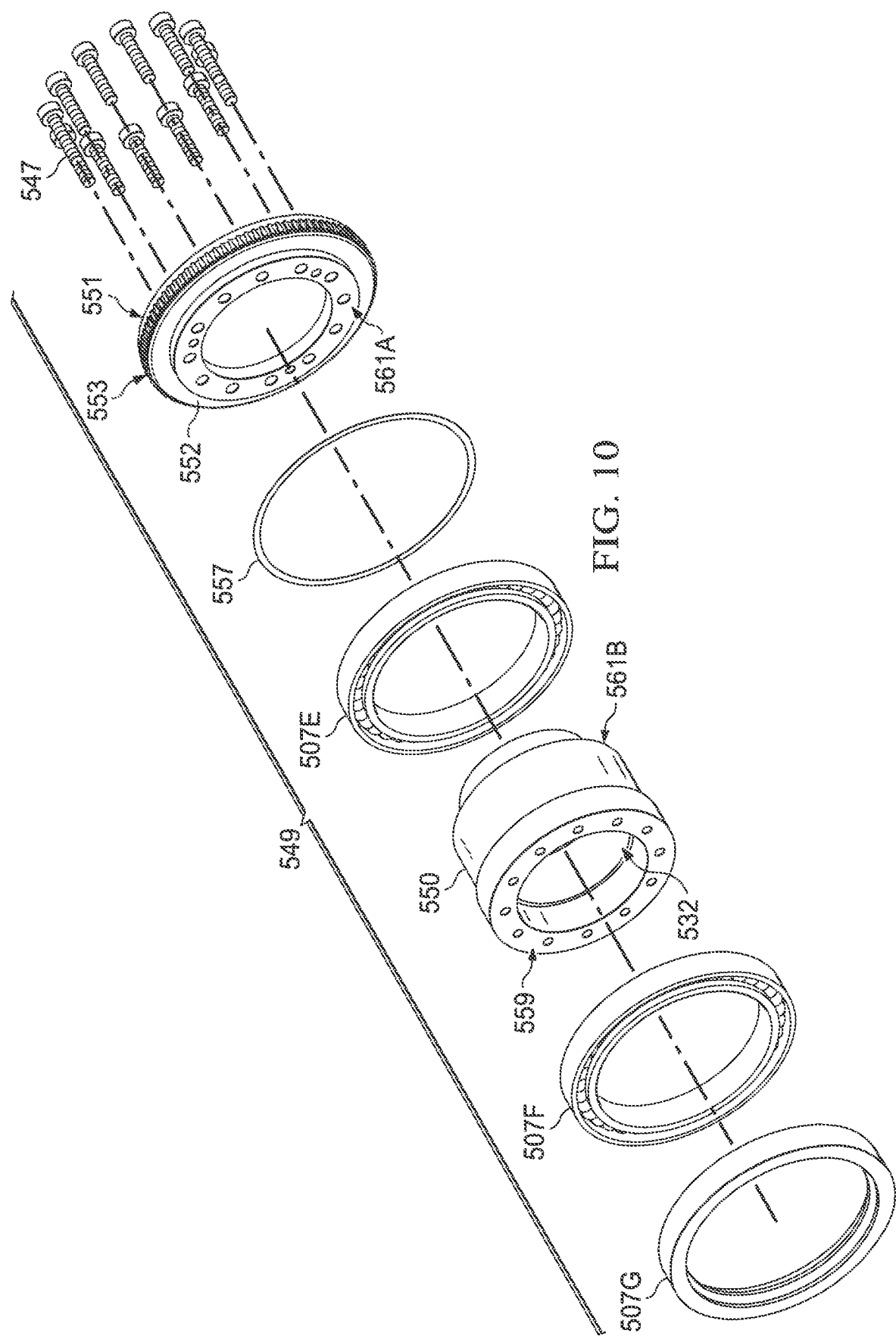
FIG. 10 is an exploded perspective view illustration of an output assembly of the gearbox mechanism shown in FIG. 7.

In FIG. 10, the output assembly 549 is illustrated in an exploded perspective view. The output device 550 can be coupled to an output gear 552. In some examples, a friction reduction mechanism 507 (shown as 507G, 507F, and 507E) may be included at various points of the coupling. An output shim 557 may also be utilized to ensure the proper alignment, proper fit, and/or preload of an output gear 552 with the output device 550. The output shim 557 by proper aligning the output gear 552 and the output device 550 can prevent a binding or other undue friction to be applied from the output gear 552 through the output device 550 to a rotational output. Each of the output device 550, friction reduction mechanism(s) 507, output shim 557, and output gear 552 can have a central aperture 532. The central aperture 532 can allow an input device (not shown) or other elements to pass through or rotate about the central axis (not shown).

The output gear 552 has an output gear circumferential surface 551 that can have an output gear interface surface 553. The output gear interface surface 553 can have a set of gear teeth, which correspond to a set of gear teeth on a gear pad of the rocker block assemblies. In at least one embodiment, the gear teeth can have generally triangular or generally triangular polygon shape with a gear teeth protrusion and a counterpart gear tooth void generally equal to the protrusion. The output gear 552 can in some examples, have an inner coupling surface defining an output coupling aperture 561A that can have a corresponding output coupling aperture 561B. The output coupling apertures 561A/561A can allow for the output gear 552, and the output device 550 to be coupled together with fasteners 547. Similarly, the output device 550 can be coupled to a rotational output through fasteners 547 coupled to a set of output device fastener aperture 559.

In at least one embodiment, the output device 550 is rotatable engaged with a first output friction reduction mechanism 507F and a second output friction reduction mechanism 507G. The first output friction reduction mechanism 507F and the second output friction reduction mechanism 507G may interact in a manner that allows one or both of the output friction reduction mechanism(s) 507F/507G to freely rotate about a central axis (not shown).

For example, the first output friction reduction mechanism 507F (bearing or roller bearing) may be friction fit to the output device 550, and a second output friction reduction mechanism 507G (oil seal) is the engaged with the first output friction reduction mechanism 507F to allow a rotational output device 550 that touches the second output friction reduction mechanism 507G or first friction reduction mechanism 507F to freely move. Alternatively, the first output friction reduction mechanism 507F may be friction fit to the output device 550, and a second output friction reduction mechanism 507G is the engaged with the first output friction reduction mechanism 507F to allow the output device 550 to freely rotate in reference to a non-moving lid (not shown) to which the second output friction reduction mechanism 507G is friction fit to. The second output friction reduction mechanism 507G, in these examples, can be friction fit to the device or lid to prevent a friction reducing fluid from exiting the device or lid, and allow for the friction reducing fluid to be utilized within the gear box mechanism.

The output device 550 can receive a third output friction reduction mechanism 507E about its circumferential surface. In at least one example, the third output friction reduction mechanism 507E engages with the output gear 552 through the output shim 557. The third output friction reduction mechanism 507E can allow for freedom of movement for the output gear 552 with vibrations or other movements with respect to the output device 550. In at least one example, the third output friction reduction mechanism 507E may be a bearing or roller bearing that can received a friction reduction fluid, or be sealed and include a friction reduction fluid within the friction reduction mechanism.

Figure 11:
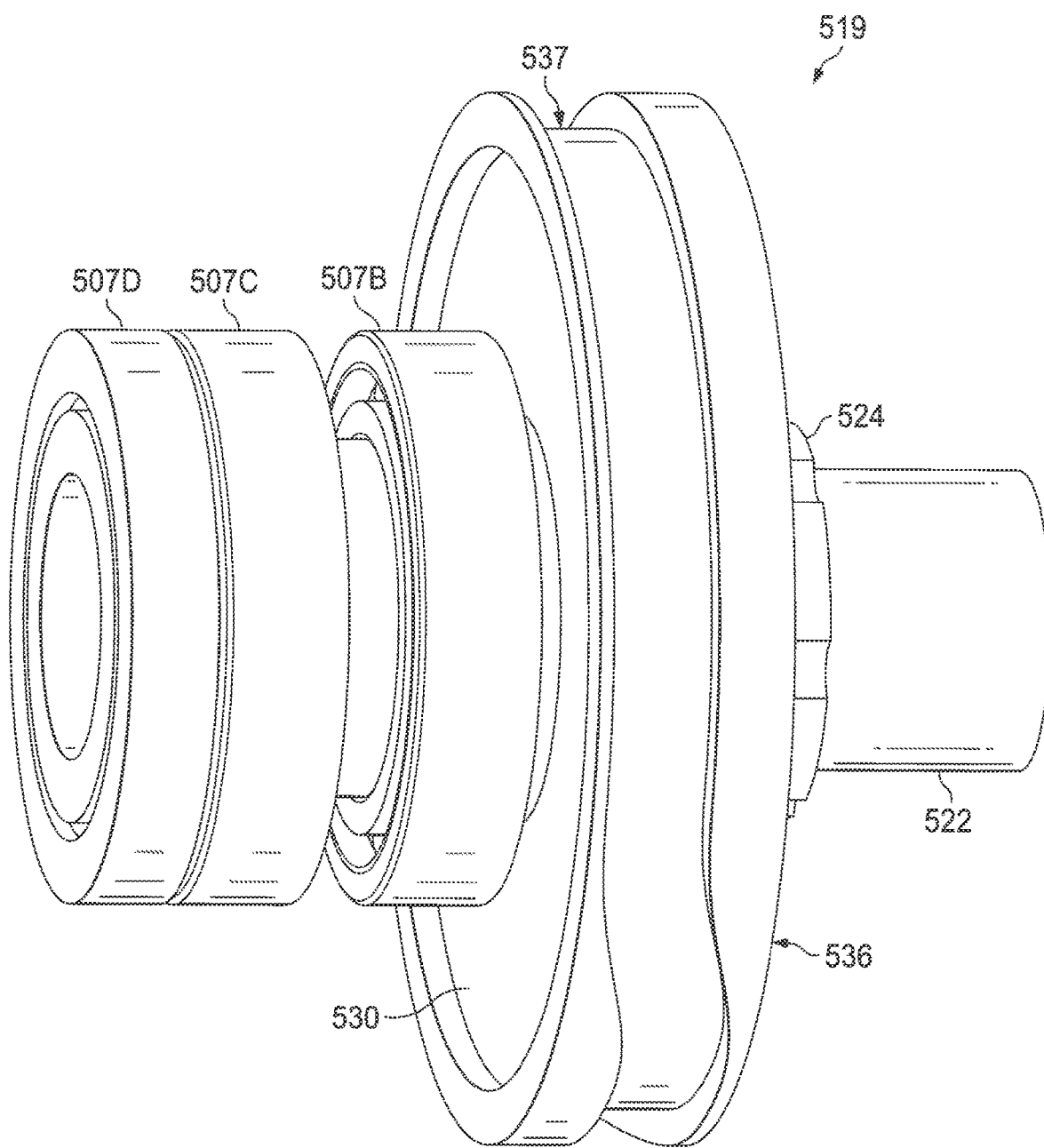
FIG. 11 is a side view illustration of an input assembly of the gearbox mechanism shown in FIG. 7.
Figure 12:
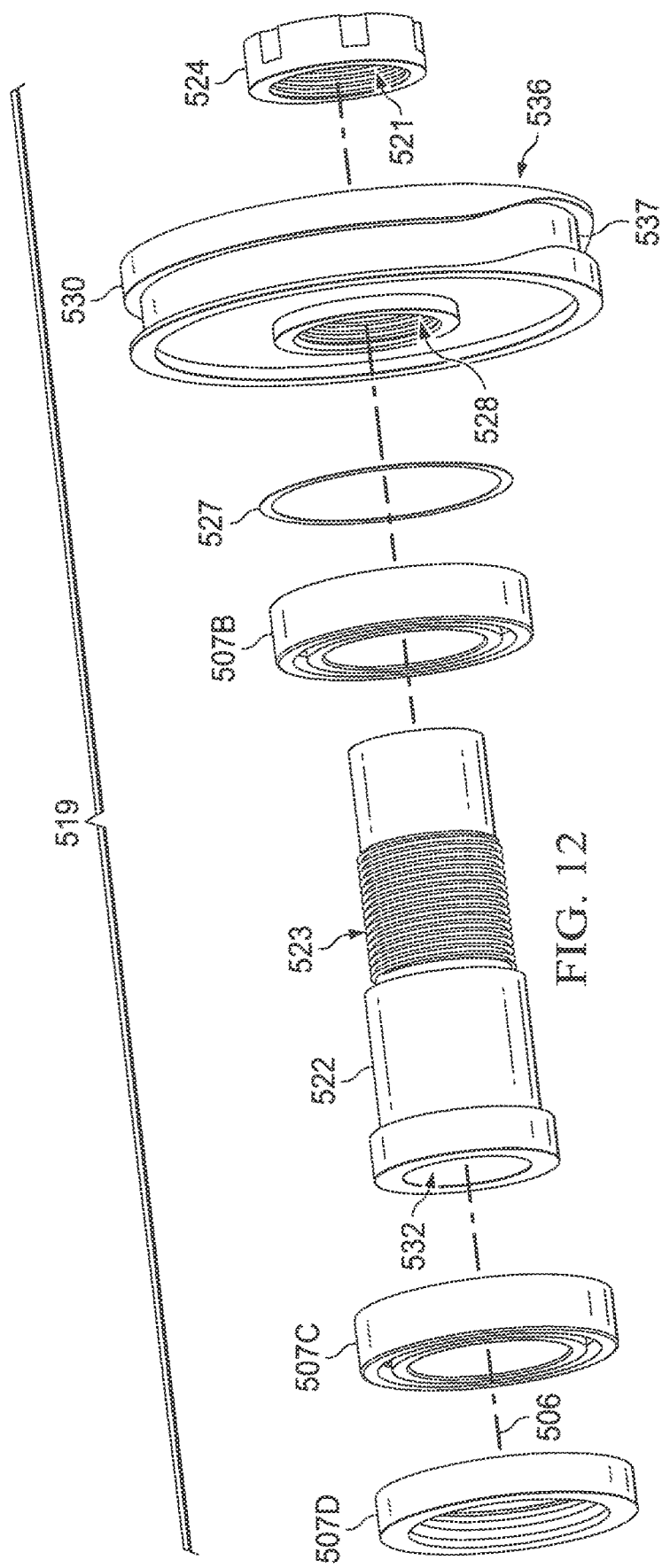
FIG. 12 is an exploded perspective view illustration of an input assembly of the gearbox mechanism shown in FIG. 7.

With reference to FIGS. 11 and 12, perspective and exploded views of an input assembly 519 are shown. The input assembly 519 can include an input device 522, a cam 530, a cam nut 524, and one or more input friction reduction mechanism(s) 507 (shown as 507D, 507C, and 507B). In at least one embodiment, the input device 522 can be rotated by a rotational input from an external device that forces a rotation of the cam 530. As the cam 530 is rotated a rocker block assembly (not shown) is engaged with one or both of an internal pathway, and an external pathway formed within a surface of the cam 530. The cam 530 is secured against the input device 522 with a cam nut 524. In at least one example, the cam nut 524 creates a friction fit or threaded connection to the input device 522 for the cam 530. The input device 522 can also be rotatably coupled or engaged with other gearbox mechanism elements (not shown) through one or more of the input friction reduction mechanism(s) 507.

For example, in at least one embodiment, the input device 522 is placed along a central axis 506 where the input device 522 can come into contact with the output gear (not shown) through a friction reducing mechanism 507. In some examples, a first input friction reduction mechanism 507D may engage with a second input friction reduction mechanism 507C wherein the second mechanism 507C is friction fit to the input device 522 and having an internal rotating structure that engages with the first mechanism 507D to allow freedom of movement to the second input friction reduction mechanism 507C. In at least one example, the first input friction reduction mechanism 507D is an oil seal that can be engaged with the second input friction reduction mechanism 507C that is a bearing or roller bearing have an fluid engagement with the first input friction reduction mechanism 507D. The second input friction reduction mechanism 507C may engage with a third input friction reduction mechanism 507B. This engagement of the second and third input friction reduction mechanisms, may be mechanical or fluid engagement through a friction reducing fluid. The third input friction reduction mechanism 507B may engage with an input shim 527. In at least one embodiment, the third input friction reduction mechanism 507B is a sealed or self-sealing bearing or roller bearing. In at least one example, the input shim allows for the alignment of the cam 530 with respect to the central axis 506.

Figure 13:
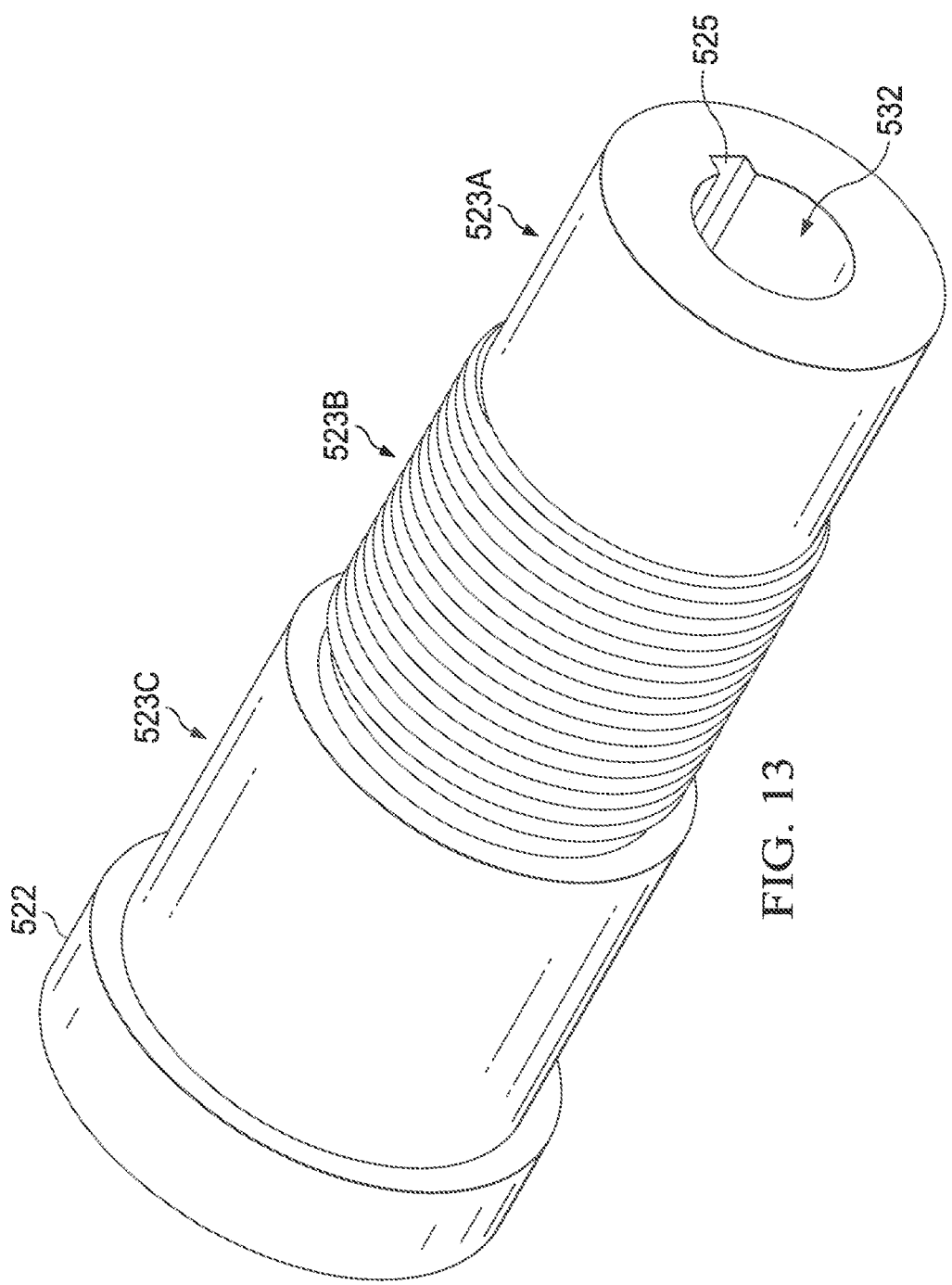
FIG. 13 is a perspective view illustration of an input device of the gearbox mechanism shown in FIG. 7.

FIG. 13 illustrates a perspective view of an input device 522. The input device 522 can have a central aperture 532 that is aligned with the central axis 506. In at least one embodiment, along the interior of the central aperture 532 the input device 522 can have an engagement point 525. The engagement point 525 can allow for an engagement of the input device 522 with a rotational device external to the gearbox mechanism (shown in FIG. 7). Along the exterior of the input device 522, a multi-level or depth set of circumferential surfaces allows for coupling of the input device 522 with the cam 530. For example, a first input circumferential surface 523A allows for the passage of the cam 530 and the cam nut 524 to the second input circumferential surface 523B. In at least one example, the second input circumferential surface 523B is a threaded surface that allows for a threaded coupling of the input device 522 with the cam 530 and the cam nut 524, through the cam threaded surface 528 and the cam nut threaded surface 521 respectively. Additionally, the second input circumferential surface 523B may also have a larger radius than the first input circumferential surface 523A. Both the first input circumferential surface 523A and the second input circumferential surface 523B may have smaller radiuses than the third circumferential surface 523C. In at least one embodiment, the circumferential surfaces 523A/523B/523C create a cylinder have a stair-step pyramid shape.

Figure 14:
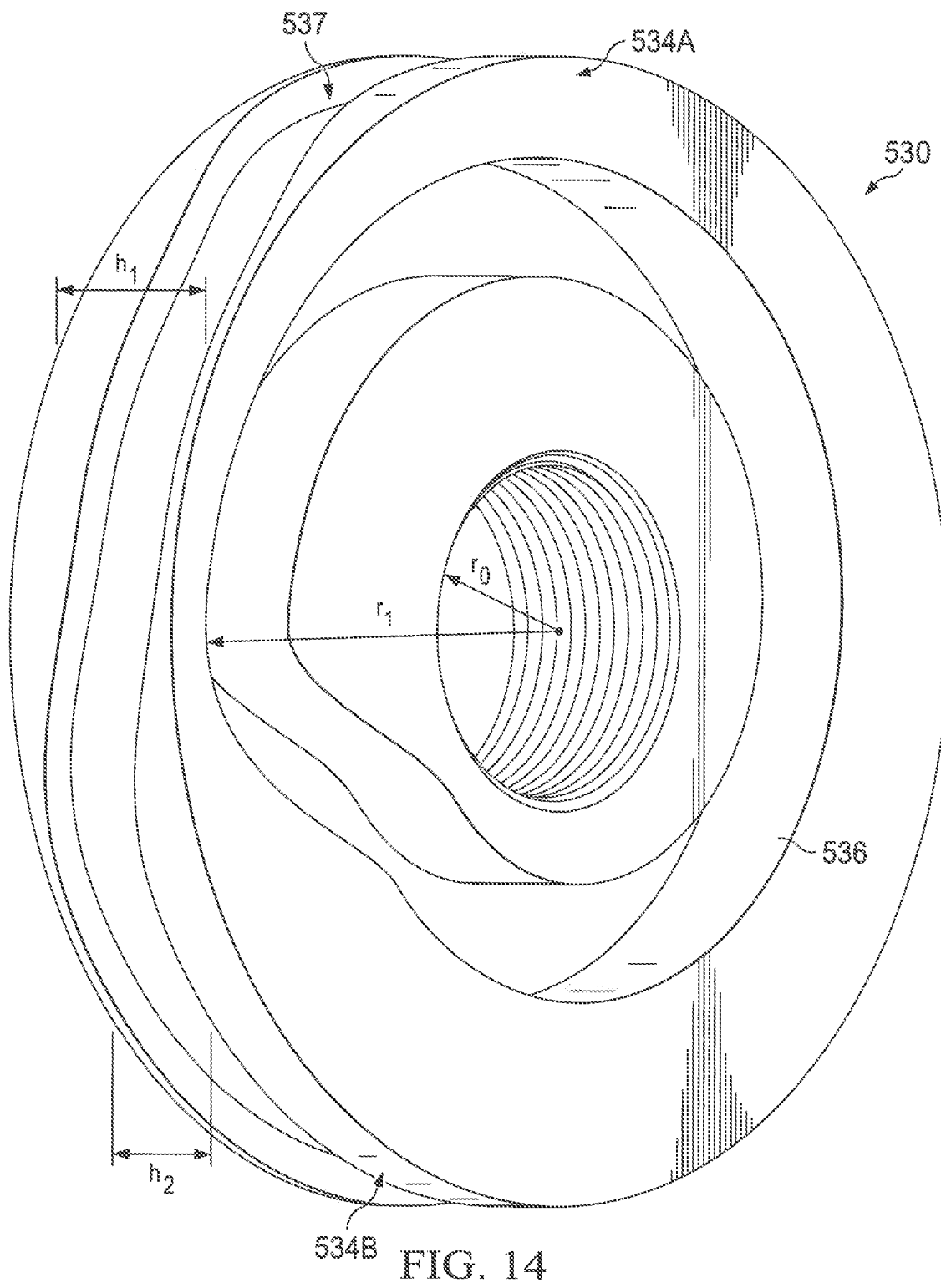
FIG. 14 is a perspective view illustration of a cam of the gearbox mechanism shown in FIG. 7.

In FIG. 14, an illustration of a cam 530 is shown. The cam 530 can have an internal pathway 536 and an external pathway 537. The internal pathway 536 can change from an initial internal radius $r_0$ to a second internal radius of $r_1$. The radius change from $r_0$ to $r_1$ can be in one example no less than the diameter of the thread pattern on an input device or cam. The radius change of the cam 530 would only be limited by the diameter of the cam 530 as there needs to be at least the input thread depth into the wall of the cam 530 between the pathways and the edge of the cam to provide a sufficient wall thickness to prevent failure of the cam 530. The cam 530 in at least one example, the cam threaded surface 528 in addition to the radius of the internal pathway 536, and the depth of the external pathway 537, and the radius from the central axis 506 to the cam threaded surface 528 would create the total radius of the cam 530, and the corresponding diameter of the cam. The cam threaded surface 528 may have a corresponding threaded surface on the input device (as shown in FIG. 13). The thread pattern of the cam threaded surface 528 may have a depth sufficient to securely engage with a corresponding thread pattern. Because of the cam threaded surface 528, and need for an outer wall of sufficient thickness to allow passage of a cam follower (shown in FIG. 18) without failure of the outer wall, the radius (and corresponding diameter) of the cam 530 may include, the radius of an input device, the thickness (depth) of the threads, the change of radius $r_0$ to $r_1$, and the depth of the external pathway or groove. It would be understood that combinations of values could result, but at a minimum cam 530 can have an inner radius no less than $r_0$—the thread thickness from the central axis 506, and an outer radius no greater than $r_1$ plus the external pathway 537 depth from the central axis 506.

The external pathway 537, in at least one embodiment is defined by the circumferential surface of the cam 530. The depth of the external pathway 537 may be of a sufficient depth that allows for a path follower to progress along the without failure of the defining walls. The height of the external pathway 537 in relation to the bottom or side opposite the planner surface the internal pathway 536 is formed into, can range from $h_0$ to $h_1$. In at least one example, the change from height $h_0$ to $h_1$ is controlled by the height (thickness or depth depending on frame of reference) of the cam 530. The height of the cam 530 would include a set of defining walls of at least a thickness proportional to the change in height $h_0$ to $h_1$, to provide sufficient support for a cam or pathway follower as it traverses the external pathway 537. The proportionality, in at least one example could be equal to the depth or height of the groove or external pathway 537 or some variation thereof. It would be understood that the internal pathway 536 may be formed into a planar surface that is perpendicular to the central axis illustrated in FIG. 7. The cam 530 may have a front and rear planar surface In at least one embodiment the internal pathway 536 and the external pathway 537 formed in the planar surface and circumferential surface of the cam 530 respectively. The pathways 536 and 537 allow for the movement and rotation of the rocker block assemblies (shown in FIGS. 17-19) by allowing gear pad interface surfaces to engage, interface, and/or interact with an output device having an output interface surface. The rocker block assemblies can have cam or pathway followers that maintain contact with the respective pathways. The pathways may also be illustrated as grooves or channels within the respective surfaces. While illustrated as a single cam 530, it is understood that the cam 530 may also comprise a plurality of separate discs, each having a unique pathway formed in its planar or circumferential surface and allow for mechanically coupling to one or more of the discs to assemble a single cam assembly 530.

Figure 15:
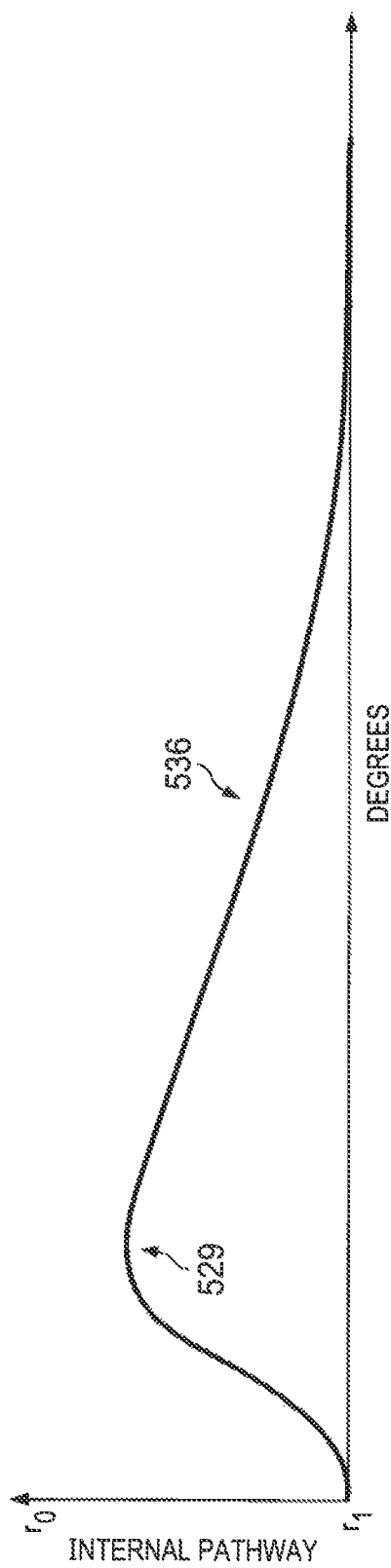
FIG. 15 is a graphical representation of the internal pathway of the cam shown in FIG. 14.
Figure 16:
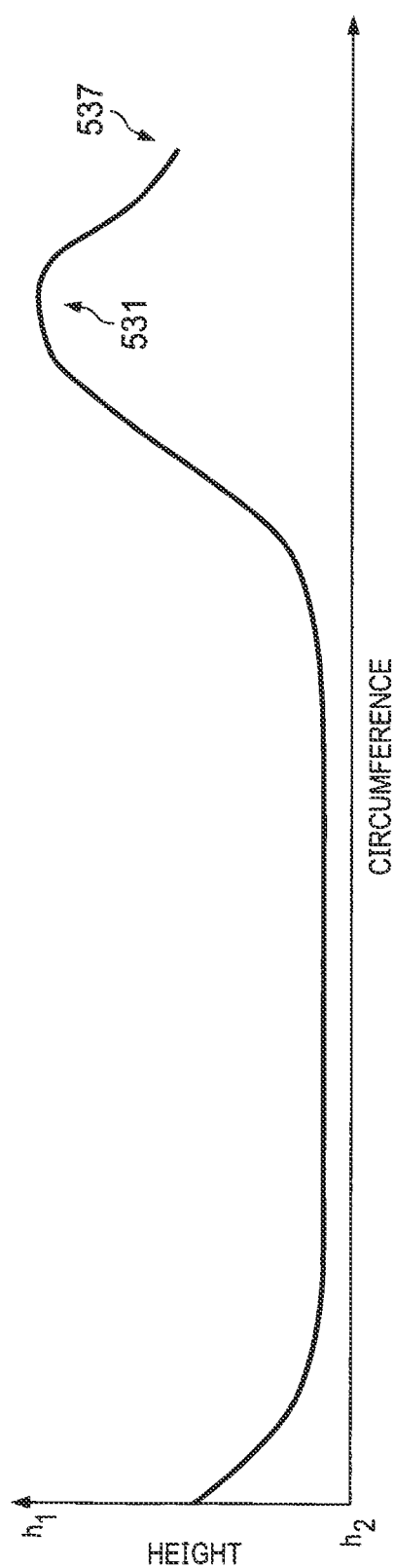
FIG. 16 is a graphical representation of the external pathway of the cam shown in FIG. 14.

In FIGS. 15 and 16, illustrations of the variation in the radius and height respectively are shown. To further illustrate the change in the radius of the FIG. 15, the vertical axis indicates the change in radius, while the horizontal axis illustrates the change in degrees (360 degrees) of the cam (as shown in FIG. 14). The change in radius has a pinnacle at the inflection point 529. The inflection point 529 is the maximum radius $r_1$ for the internal pathway 536 as measured from the center of the cam. At the inflection point 529 the radius change converts from an upward or increasing radius (left side of the inflection point 529) to a generally downward or decreasing radius (right side of the inflection point 529). While illustrated as a single inflection point, other inflection points may also be included along the internal pathway 536 to allow for additional pivoting, rotation, or movement of a rocker block assembly (illustrated in FIG. 18). In at least one embodiment, the change in radius causes a rocker block assembly to pivot, rotate, rock and/or otherwise move in accordance with the predefined pattern formed into the planar surface of the cam.

Similar to the internal pathway 536, the external pathway 537 have a rise point 531 that allows for the engagement and disengagement of a gear pad (shown in FIG. 18) from an output gear (shown in FIG. 10). The rise point 531 is the transition from an engaged gear pad to a disengaged gear pad. In at least one embodiment, the rise point 531 indicates the point at which the gear pad is fully disengaged from the output gear and begins a transition to reengagement. For example, by varying the radius of the internal pathway 536, a rocker block assembly (shown in FIGS. 17-19) can pivot about its pivot point to compensate positional changes and maintain contact between the output device and the rocker block assemblies. This pivoting or moving of the rocker block assemblies, in some examples the rocker block and rocker arm, about its pivot point induces movement of the rocker block assemblies in a rotational (two dimensions on a Cartesian coordinate system) movement for a measurable angular dimension. Each of the rocker block assemblies operate independently of one another, and each will be mapped to a specified rotational movement and an individual measurable angular dimension. While illustrated as have gear pads (shown in FIG. 18) of equal length, in some examples, each of the gear pads may have their own individual lengths and accordingly would have different rotational movements and measurable angular dimension. In at least one example, the rotational movement and the measurable angular dimension allows for a left, right, in, or out motion when referenced from the center of the cam 530.

Additionally, for example, by varying the height of the external pathway 537, the rocker block assembly can be raised and lowered to compensate for positional changes and maintain contact between the output device and the rocker block assemblies. The raising and lowering induces the engagement of the interface surfaces of an output assembly and a gear pad. The raising and lowering movement is generally perpendicular to the rotational movements induced by the internal pathway 536, thus creating a three-dimensional movement in a Cartesian coordinate system. The combination of the rotational movement and the linear movement perpendicular to the rotational movement creates multiple biasing positions for the rocker block assemblies.

For example, at the inflection point 529 a rotational biasing may occur along with a linear engagement biasing, while at the rise point 531 a linear neutral or unbiased position may occur along with a rotational neutral or unbiased position. These biasing positions will be discussed in more detail with FIGS. 20-22.

The cam 530 includes a planar surface 534A having at least one planar or internal pathway 536 formed therein. In at least one example, the pathway 536 will have a single depth that is uniform along the entire pathway 536. In a preferred embodiment, the planar surface 534A of the cam 530 is substantially perpendicular to the axis of rotation of the cam 530. While the planar surface 534A in FIG. 14 is depicted on the side of the cam 530 facing the cam nut 524, it should be understood that the planar surface into which internal pathway(s) 536 is formed may be configured on either facing side of the cam element 530 (i.e., either a planar surface facing the cam nut 524 or a planar surface facing away from the cam nut 524). In other examples, the internal pathway 536 may vary in depth along the length of the pathway 536. The internal pathway 536 can allow a cam follower (see FIG. 18) to generate a pivot or pivoting force on a rocker arm and/or gear pad (see FIG. 18). As the cam follower traverses the internal pathway 536 the pathway can change in direction (radius) to move a rocker arm and/or gear pad coupled to the cam follower. Similarly, the external (circumferential) pathway 537 is formed in the circumferential surface 534B of the cam 530. A pathway follower (see FIG. 18) may track or follow the external pathway and change directions (height) based on the pathway, causing the rocker arm and/or gear pad to move, rotate, or pivot. Both the external and internal pathways 536/537 can have a single depth, or may vary in depth to allow for additional movements, rotations, or pivoting of the rocker block assemblies (shown in FIG. 18). In at least one embodiment of the present disclosure, the cam 530 will have a single pathway on a one of its planar surfaces and single pathway on its circumferential surface, however there maybe multiple paths formed in the cam 530 that can be in the same plane where they are parallel paths, or paths of different distances from the central axis 506, or the paths can be in separate planes stacked in directions parallel and perpendicular to the central axis 506.

Figure 18:
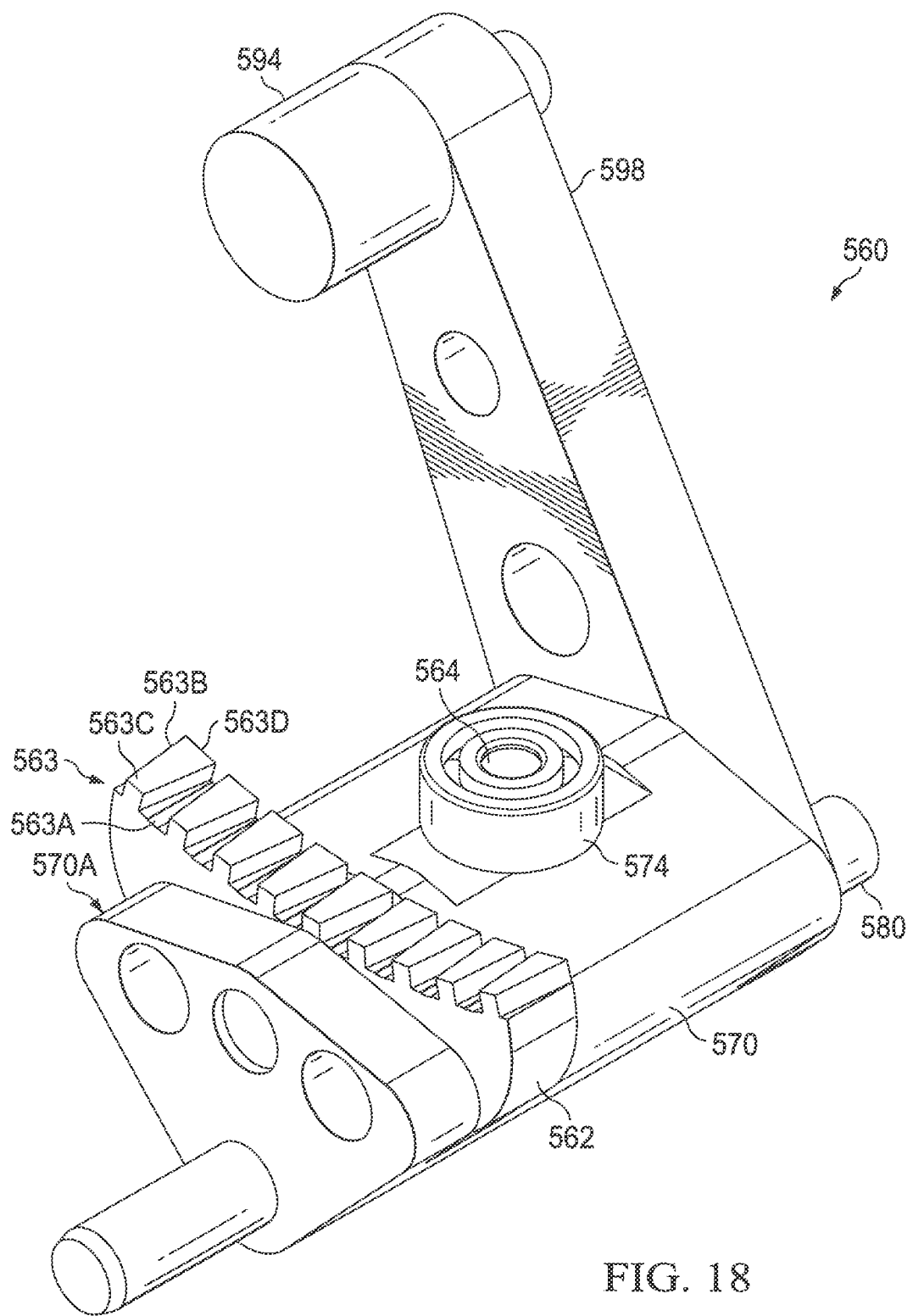
FIG. 18 is an alternative perspective view illustration of a rocker block assembly of the gearbox mechanism shown in FIG. 7.
Figure 19:
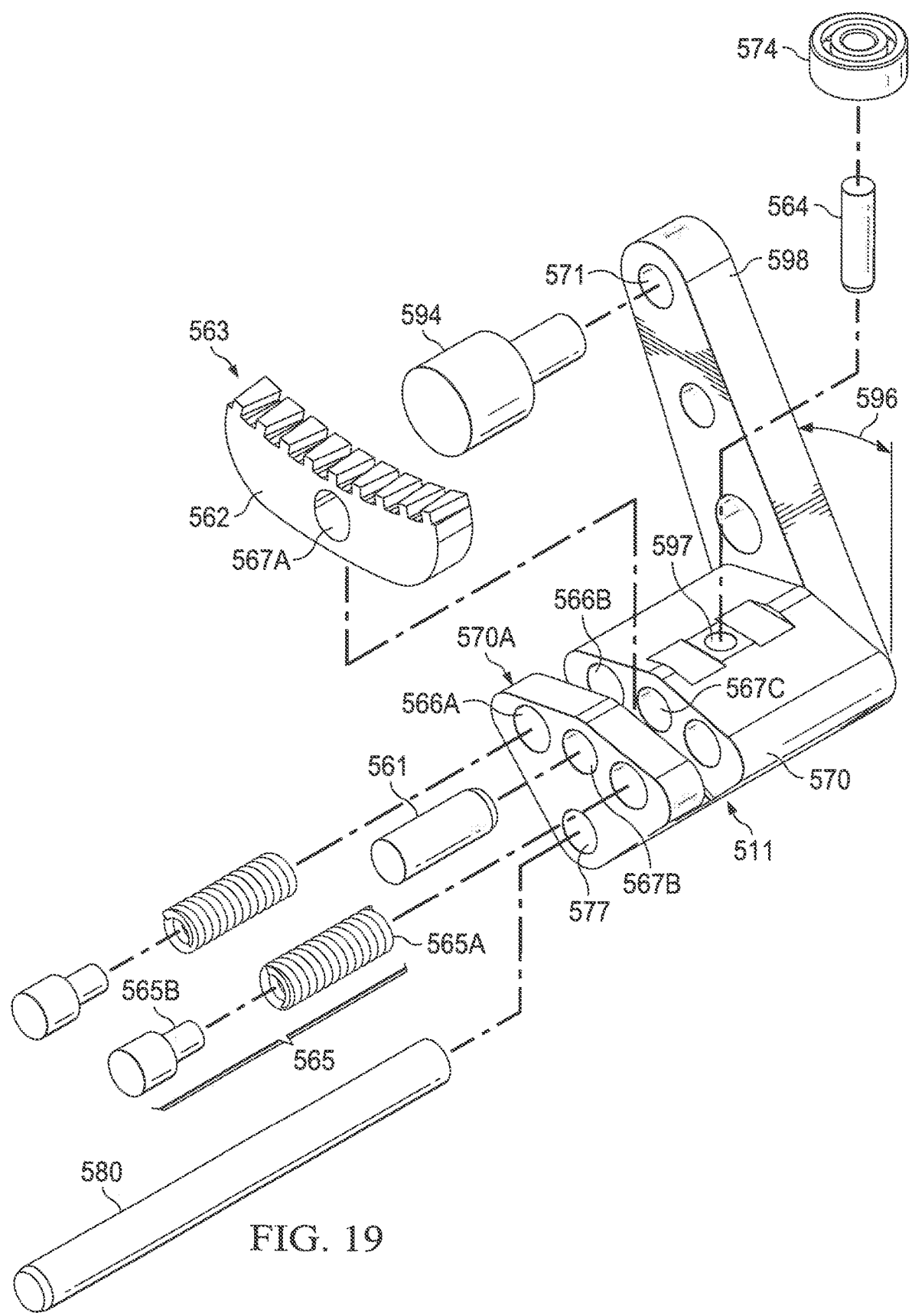
FIG. 19 is an exploded perspective view illustration of a rocker block assembly of the gearbox mechanism shown in FIG. 7.

In FIGS. 17, 18, and 19, illustrations of the rocker block assemblies 560 are shown. The rocker block assemblies 560 can include a rocker block 570, a gear pad 562, a pivot pin 580, and a cam follower 594. The rocker block 570 can rotate or pivot about a pivot point that is associated with the pivot pin 580. While illustrated having a generally triangular shape across the cross-section it would be understood that the rocker block 570 can have any number of cross-sectional shapes such as square, rectangular, circular, or other shapes. In at least one embodiment, the rocker block 570 can have a rocker arm 598 that is coupled, formed, or fastened to the rocker block 570. For example, the rocker block 570 and the rocker arm 598 may be one piece or may be separate pieces that are joined together through a coupling or fastening device.

Figure 20:
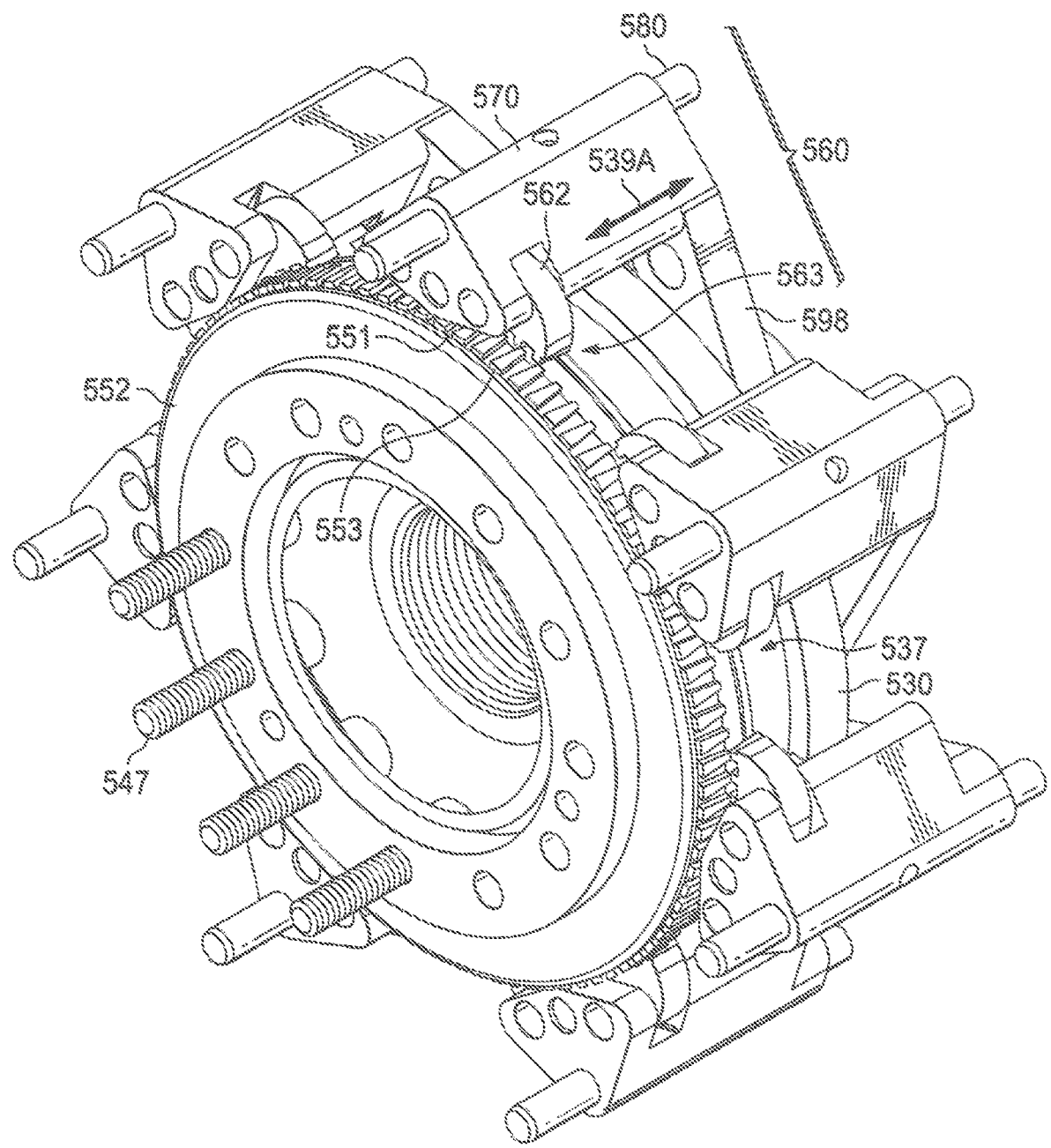
FIG. 20 is a perspective view illustration of rocker block assembly interaction with an output assembly of the gearbox mechanism shown in FIG. 7.
Figure 21:
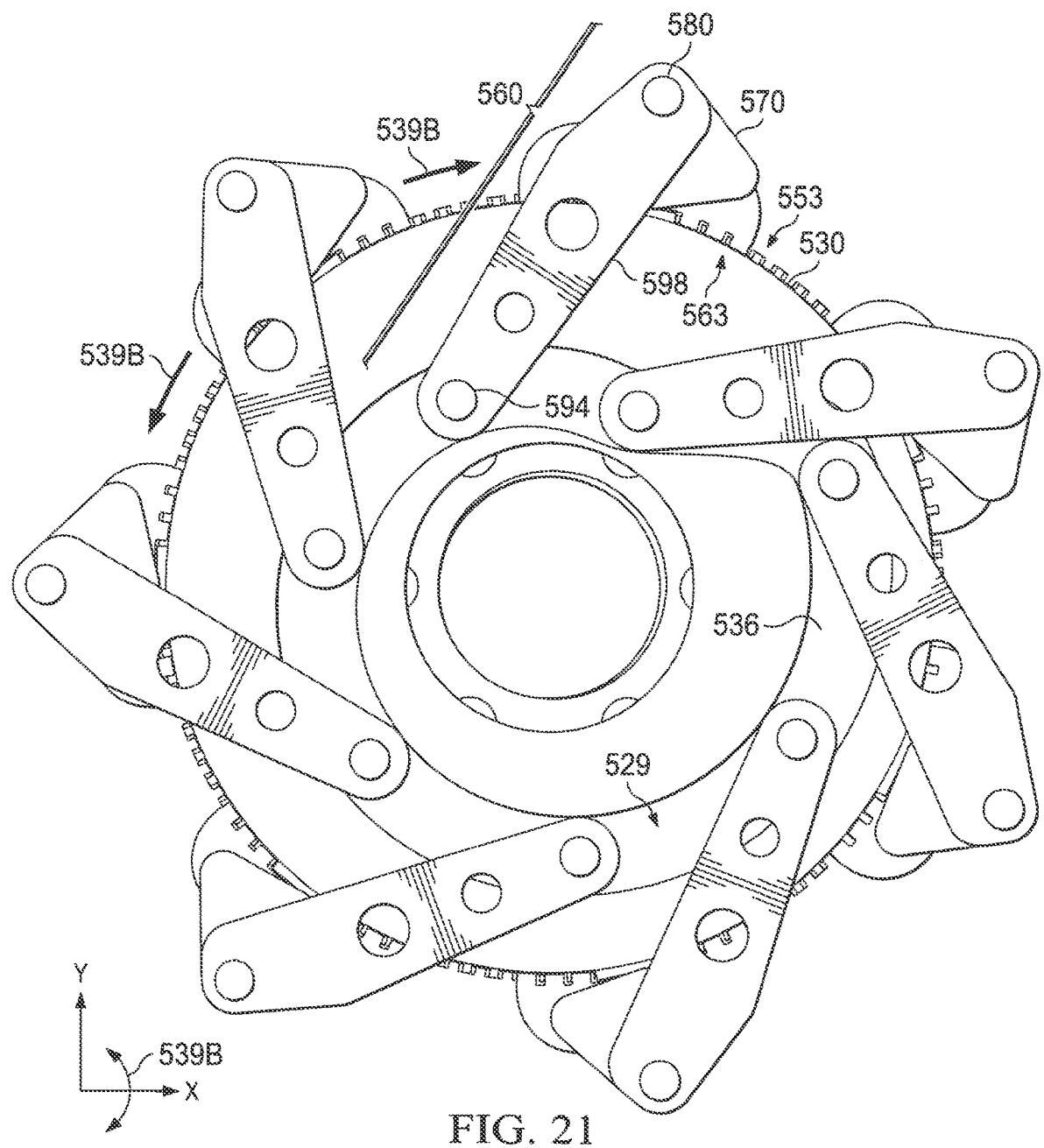
FIG. 21 is a rear view illustration of rocker block assembly interaction with an output assembly of the gearbox mechanism shown in FIG. 7.
Figure 22:
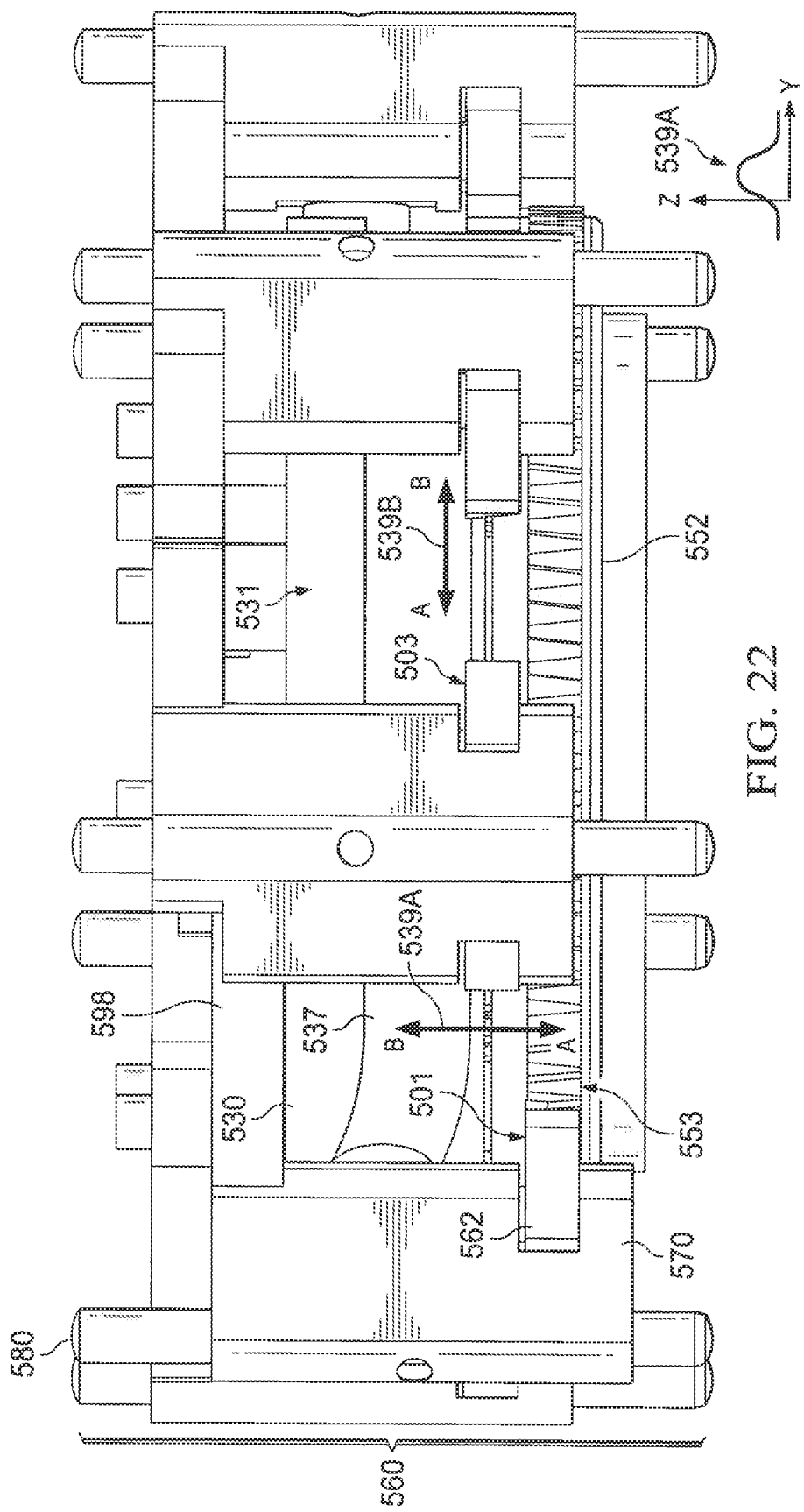
FIG. 22 is a side view illustration of rocker block assembly interaction with an output assembly of the gearbox mechanism shown in FIG. 7.

The pivot pin 580 can allow for the movement of the rocker block 570 based on the movements of the cam (shown in FIGS. 20-22). As the cam rotates, the cam follower tracks the pathways formed into the cam, which cause the movement, rotation, or pivoting of the rocker block assembly 560, and more specifically, the rocker block 570. To counter or bias against the movement, rotation, or pivoting induced by the cam follower following the cam pathway(s), the pivot pin can act as the pivot point about which the rocker block assembly 560 can move, rotate, or pivot about.

As seen in more detail in FIG. 18, but still in reference to FIGS. 17-19, the rocker block 570 may also include a pathway follower 574 in addition to the cam follower 594. The pathway follower 574 may be coupled, attached, or fastened to the rocker block 570 through a pathway follower pin 564. In some examples, the pathway follower pin 564 may act as the pathway follower, where the pathway follower 574 is a friction reducing mechanism such as but not limited to a set of bearing, roller, or roller ball bearings. The pathway follower 574 allows for the rocker block assembly to follower or track multiple pathways formed into multiple surfaces of the cam. For example, the cam may have a pathway formed into a planar surface in a direction that is vertical or parallel with a central axis, while another pathway may be formed along the circumferential surface of the cam in a direction that is horizontal or perpendicular to (towards or away from) the central axis.

The gear pad 562, is generally an oval shape or circular shape and in at least one embodiment, includes an interface surface 563. It would be understand that the gear pad 562 may have any number of cross sectional shapes or structures. The interface surface 563 can include a set of gear teeth voids 563A, gear teeth protrusions 563B, where each of the voids and protrusions have a first end 563C, and a second end 563D. As an example, when looking at the gear teeth protrusions 563B, the first end 563C is narrower or smaller than the second end 563D, which is larger than the first end 563C. The gear teeth void 563A may correspond to a gear teeth protrusion 563B where each is flipped along vertically with reference to one another. For example, when viewed with respect to a horizontal reference the first end of a protrusion would be next to a corresponding second end of a void. A corresponding interface surface may be found configured with an output assembly. In other examples, the interface surface 563 may include post and hole, tongue and groove, friction fit surface or other interfacing means.

In at least one embodiment, the rocker block assembly 560 moves as a whole based on the following or tracking of the pathways formed into the cam. For example, the entire rocker block assembly may move up and down based on following the pathway formed into the circumferential surface of the cam, additionally a rotational or pivoting movement may also occur based on a following or tracking of the pathway formed into the planar surface of the cam.

The rocker block assembly 560 can be seen in an exploded view in FIG. 19, with gear pad 562 having a set of compliance devices 565. The rocker block 570 or rocker arm 598 can each have one or more apertures or voids for receiving portions or parts of the rocker block assembly 560. For example, the rocker block can have compliance aperture(s) 566A, and/or 566B, as well as a pad pin aperture 567B. In at least one example, the compliance apertures 566A and 566B can be configured for receiving the compliance device 565, and the pad pin aperture 567B can be configured to receive the pad pin 561. The pad pin aperture 567B can have a corresponding pad pin aperture 567A defined by the gear pad 562. The pad pin 561 can pass through the gear pad 562 via the pad pin aperture 567A and the rocker block 570 via the rocker block standoff 570A and pad pin aperture 567B that is partially separated from the main rocker block 570 by the gear pad void 511, and securing in the pad pin aperture 567C defined by the main rocker block 570. The gear pad void 511, can be a space have no physical structure within it, and be defined by the main rocker block 570. Similarly, compliance device apertures 566A, and 566B can be defined by the rocker block standoff 570A and the main rocker block 570. It would be understood that the rocker block standoff 570A can be part of, coupled or fastened to the main rocker block 570. In at least one embodiment, the rocker block standoff 570A is a portion of the rocker block 570 that is adjacent to the gear pad void 511 that is also adjacent to the rocker block 570, and wherein the gear pad void 511 is formed into the rocker block 570 with a depth that does not pass through the entire cross section of the rocker block 570. The rocker block 570 or rocker block standoff 570A may also define a pivot pin aperture 577. The pivot pin aperture can be configured to allow the pivot pin 580 to pass through the length of the rocker block 570. In at least one example, the pivot pin 580 and/or pivot pin aperture 577 may also pass through the rocker block standoff 570A. The rocker block 570 may also define a pathway pin aperture 597 that allows for a pathway pin 564 or pathway follower 574 to be coupled to the rocker block 570.

Compliance mechanics or compliance mechanisms allow for a force or energy to be transferred to another body or object through a deformation or elastic body. Housed within the rocker block 570, one or more compliance devices 565 that can include a spring 565A and a plug 565B. The spring 565A can be placed within the compliance apertures 566A/566B and rest within the spaced defined by the compliance apertures 566A/566B within the rocker block 570. In at least one embodiment, the spring 565A is an axial spring. In at least one example, the plug 565B can be coupled and/or affixed with the spring 565B to provide an even, consistent, or flat surface with which to apply a compliance force. While in other example, the spring alone can provide the compliance force. It would be understood that other compliance mechanisms or materials may be utilized other than springs or plugs. Some examples of these other compliances mechanisms or materials can have a memory or alloy effect that allows for the transfer of energy from the rocker block 570 to the gear pad 562, or in other locations throughout the gearbox mechanism.

In at least one embodiment, the set of compliance devices 565 apply a compliance force against the gear pad 562 that causes the gear pad interface surface 563 to be engaged with an output gear interface surface (shown in FIG. 10) in an amount sufficient to allow for the designed biasing of the interface surfaces both in the positive (forward) and negative (backward) directions. Some examples may also allow the compliance device 565 to create a compliance force that keeps the gear pad 562 within the gear pad void 511 and/or against the rocker block standoff 570A. The rocker block standoff 570A can oppose the compliance aperture 566B and define its own compliance aperture 566A.

The rocker block 570 may also have a rocker arm 598 that can be coupled or fastened to the rocker block 570 or can be formed as part of the rocker block 570. In at least one embodiment, the rocker arm 598 is formed with an offset angle 596 that allows for the positioning of the cam follower 594 at a position to trigger, induce, and/or cause the movement, rotation, or pivoting of the rocker block assembly 560 based on the movement of the cam (shown in FIGS. 20-22). The offset angle 596 can be calculated as part of the calculations for the cam pathways in order to minimize or maximize rotational movement of the output device in relation to the rotational movement of the cam. The cam follower 594 can be received by the rocker arm 598, which defined a cam follower aperture 571. The cam follower 594 is illustrated as being one piece but it would be understood the cam follower 594 could be created with a cam follower post and a cam follower friction reduction mechanism similar to the pathway follower pin 564 and pathway follower 574.

FIGS. 20, 21, and 22 show the movements, rotations, or pivoting of the rocker block assemblies 560, cam 530, and output gear 552. As the rocker block assemblies 560 engage with the output gear 552. The engagement can occur through the gear pad 562 and the output gear 552. Both the gear pad 562, and output gear 552 have respective interface surfaces 563 and 553. The gear pad interface surface 563 can engage with the output gear interface surface 553 as the rocker block assemblies 560 move in relation to the external pathway 537 formed into the circumferential surface of the cam 530. As the rocker block assembly 560 moves along with the external pathway 537 the rocker block 570 and gear pad 562 may shift along the pivot pin 580. The pivot pin 580 can allow for a sliding movement by the rocker block 570 that is limited by the height difference of the external pathway 537. The movement of the rocker block assemblies 560 can be characterized as a first portion of movement 539A. The first portion of movement 539A can have a corresponding rotational (two-dimensional) movement portion illustrated in FIGS. 21 and 22.

The second portion of movement 539B is a rotational movement (two-dimensional movement in Cartesian coordinates) that movements the output device or output gear a specified distance that is programmed or calculated to result as the rocker block assemblies are moved in associates with the internal pathway 536 of the cam 530. As the cam follower 594 travels, tracks, or follows the internal pathway 536 formed into the planar surface 529 of the cam 530 the rocker arm 598 and/or rocker block 570 pivot, rotate, or move about the pivot pin 580. The second portion of movement 539B can have two extremes, a forward biasing position, and a rearward biasing position. In at least one example, the forward biasing position allows for forward movement of the rocker block assemblies and accordingly the output device or output gear. Further to this example, the rearward biasing position allows for the rocker block assemblies to slow and/or prevent a binding of the rocker block assemblies 560, output device or output gear. This anti-binding, rearward biasing position prevents the output device or output gear from slipping, sliding, or otherwise moving past the desired positioning that could prevent the engagement of the gear pad with the output device or output gear. The rocker block assemblies 560 can also have a neutral or unbiased position, and a transitioning position along the second portion of movement 539B.

For example, a gear pad interface surface 563 can engage and/or disengage from an output element interface surface 553. The gear pad 562 will move in a cyclical manner as a result of the pivot movements of the rocker block 570, rocker arm 598 and cam followers 594. In at least one version, the rocker block can have four positions. A first position (or transitioning position) allows for the gear pad to traverse or move to a new position to begin a new rotation of the output device 550. The second position (or engaged or positive bias movement position) allows for the gear pad to generate a rotational or pulling force on the output device 550. The third position (or neutral or balanced position) may allow the gear pad 562 to be in a position to engage, rotate, or disengage from the output element interface surface with no forces generated on the output device. The fourth position (i.e., reverse tension or negative bias configuration) allows for a tension to be placed on the output device 550 to assist in the prevention and/or elimination of backlash of the output device 550. In addition, the rocker block assemblies 560 of the present invention reduce backlash to zero and even preloaded conditions to create a tight connection between the power source and/or the powered device (not illustrated). This is an extremely desirable feature especially for high vibration applications. Moreover, because the stresses associated with engagement of the gear pad 562 against the output device 550 are distributed across a greater area, the gear pad 562 may be manufactured of lighter-weight materials, which are typically less expensive and easier to manufacture, with no degradation in reliability.

As shown in FIGS. 20 and 21, and further shown in FIG. 22, the rocker block assemblies 560 can engage and/or move the output gear 552 specified distances in accordance with the rotations of the cam 530, and the pathways formed within the cam 530. The rocker block assemblies 560 can have a first portion of movement (linear, vertical, or one dimensional) 539A, which works in conjunction or combination with a second portion of movement (rotational, horizontal, or two-dimensional) 539B that allows for a three-dimensional cyclical pattern of movement for the rocker block assemblies 560. The first portion of movement 539A corresponds to the external pathway 537 formed into the circumferential surface 534B of the cam 530. The second portion of movement 539B corresponds to the internal pathway shown in FIG. 14, and tracking or following of the cam follower (shown in FIG. 18) coupled to the rocker arm 598. These portions of movements 539A/539B induce the movement, rotation, or pivoting of the rocker block 570 or rocker block assemblies 560 about specified pivot points, including but not limited to about the pivot pin 580.

During the movements one or more of the rocker block assemblies 560 engage (via the gear pad or gear pad interface surface) with the output gear 552, or output gear interface surface 553. An example of this engagement is illustrated as engagement 501, and an example of disengaged or disengagement is illustrated as disengagement 503. It is understood that the three-dimensional circuit depicted in the drawings is not to scale and is somewhat exaggerated to illustrate the general principal of the invention. For example, the distance A-B would typically be much smaller than depicted. The travel path or circuit 539A/539B of each rocker block assembly 560 is controlled by adjusting the size and configuration of the rocker block assembly 560, gear pad(s) 562, and/or altering the pathways or grooves 536,537 formed in the cam 530. For example, the travel path or circuit of each gear pad 562 is controlled by adjusting the length, width, height, and/or size of the respective gear pad 562 and/or rocker arm 599 and/or altering the pathways or grooves formed in the cam 530.

Numerous embodiments of gearbox mechanisms are possible using the rocker block assembly of the present invention. All embodiments of gearbox mechanisms constructed in accordance with the present invention feature a plurality of rocker block assemblies configured about the central axis 506 of the cam 530 and may comprise either an odd or even number of rocker block assemblies. At least two, and preferably three or more, rocker block assemblies are required for a gearbox mechanism of the present invention. The movement of the rocker block assemblies typically moves in a rotational series to one another.

However, in a preferred embodiment of the present invention wherein the plurality of rocker block assemblies comprises four or more even-number rocker block assemblies, the rocker block assemblies configured on opposing sides of the cam 530 engage and disengage in unison from the secondary or output device 550. For example, an embodiment of the gearbox mechanism 520 may feature four rocker block assemblies 560. Similarly, another embodiment of the gearbox mechanism 520 may feature six rocker block assemblies 560. This is accomplished by ensuring that the individual pathways or grooves formed in the planar surface of the cam 530 are in phase with one another along the planar surface of the cam 530.

It will now be evident to those skilled in the art that there has been described herein an improved gearbox mechanism. Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

We claim:

1. A rocker block assembly comprising:
a rocker block having a gear pad void configured to receive a gear pad;
a pivot pin aperture defined by the rocker block and configured to receive a pivot pin;
a gear pin aperture defined by the rocker block and configured to receive a gear pad pin;
a set of compliance apertures defined by the rocker block and each compliance aperture configured to receive a compliance mechanism;
a path follower aperture defined by the rocker block and configured to receive a pathway follower;
a rocker arm attached to the rocker block; and
a cam follower void defined by the rocker arm and configured to receive a cam follower.

2. The rocker block assembly of claim 1, wherein the rocker block further comprises an extension arm extending from a first end of the rocker block wherein a second end of the rocker block attaches to the rocker arm.

3. The rocker block assembly of claim 2, wherein the extension arm couples to an extension block.

4. The rocker block assembly of claim 3, wherein the extension block comprises an extension pivot pin void, a set of compliance voids, and a gear pin void.

5. The rocker block assembly of claim 1, wherein the gear pad further comprises a gear pin void configured to receive the gear pad pin.

6. The rocker block assembly of claim 1, wherein the compliance mechanism further comprises a plug, and a spring.

7. The rocker block assembly of claim 1, wherein the compliance mechanism is configured to apply a force to the gear pad.

8. The rocker block assembly of claim 1, wherein the pathway follower further comprises a pathway follower pin, and a pathway friction reducing mechanism.

9. The rocker block assembly of claim 1, wherein the cam follower further comprises a cam follower pin, and a cam follower friction reducing mechanism.

10. The rocker block assembly of claim 1, wherein the pathway follower and the cam follower each include a friction reducing mechanism.

11. A cam actuated gearbox mechanism comprising:
a set of rocker block assemblies;
a cam assembly configured for mechanical engagement with the set of rocker block assemblies and a cam of the cam assembly;
wherein the cam has an interior pathway and an exterior pathway, and the cam assembly is configured to receive a rotational input from a rotating device;
an output assembly having an output gear mechanically engaged with the set of rocker block assemblies; and
a housing configured for containing the said assemblies.

12. The cam actuated gearbox mechanism of claim 11, wherein each of the rocker block assemblies further comprises a rocker block configured to receive a gear pad; a rocker arm attached to the rocker block and configured to receive a cam follower; and a pathway follower configured to couple with the rocker block through a pathway follower aperture; and a set of compliance mechanisms housed within the rocker block for applying a compliance force to the gear pad.

13. The cam actuated gearbox mechanism of claim 12, wherein the cam follower is configured to engage the interior pathway of the cam, wherein the interior pathway varies in a direction radially from a central axis.

14. The cam actuated gearbox mechanism of claim 12, wherein the pathway follower is configured to engage the exterior pathway of the cam, wherein the exterior pathway of the cam varies in height in a direction parallel with a central axis.

15. The cam actuated gearbox mechanism of claim 11, wherein the cam assembly further comprises an input device configured to receive the rotational input.

16. The cam actuated gearbox mechanism of claim 15, wherein the input device is partially threaded and configured to receive a cam nut.

17. The cam actuated gearbox mechanism of claim 16, wherein the cam is axially engaged with the input device, and secured by the cam nut.

18. The cam actuated gearbox mechanism of claim 11, wherein output assembly further comprises an output device.

19. The cam actuated gearbox mechanism of claim 18, wherein the output device is fastened to the output gear.

20. The cam actuated gearbox mechanism of claim 19, wherein the output gear engages with a gear pad of each rocker block assembly.

21. The cam actuated gearbox mechanism of claim 11, wherein the housing includes a main body and a lid.

22. The cam actuated gearbox mechanism of claim 21, wherein the main body further comprises rocker block assembly indentions.

23. The cam actuated gearbox mechanism of claim 22, wherein the main body further comprises a set of hub pivot pin apertures configured to receive a pivot pin of the rocker block assembly.

24. The cam actuated gearbox mechanism of claim 23, wherein the rocker block assemblies pivot about the pivot pin in the rocker block assembly indentions.

25. A method of operating a gearbox mechanism comprising:
rotating a cam having an internal pathway and an external pathway;
inducing a movement of rocker block assembly based on rotation of the cam; and
engaging a rocker block interface surface of the rocker block assembly with an output gear interface surface of an output device;
wherein the engagement transfers the movement of the rocker block assembly to the output device.

26. The method of claim 25 wherein the internal pathway varies from a first radius to a second radius.

27. The method of claim 26 further comprises pivoting the rocker block assembly based on said variation of radius from the first radius to the second radius.

28. The method of claim 25 wherein the external pathway varies from a first height to a second height.

29. The method of claim 28 further comprises transitioning the rocker block assembly based on said variation of height from the first height to the second height.

30. The method of claim 25, wherein a cam follower of the rocker block assembly follows the internal pathway, and a pathway follower of the rocker block assembly follows the external pathway.

* * * * *